United States Patent
Yamamoto

(10) Patent No.: US 11,364,805 B2
(45) Date of Patent: Jun. 21, 2022

(54) VEHICLE BRAKE CONTROL DEVICE

(71) Applicant: ADVICS CO., LTD., Kariya (JP)

(72) Inventor: Takayuki Yamamoto, Nagakute (JP)

(73) Assignee: AD VICS CO., LTD., Kariya (JP)

( * ) Notice: Subject to any disclaimer, the term of this patent is extended or adjusted under 35 U.S.C. 154(b) by 180 days.

(21) Appl. No.: 16/645,637

(22) PCT Filed: Sep. 26, 2018

(86) PCT No.: PCT/JP2018/035542
§ 371 (c)(1),
(2) Date: Mar. 9, 2020

(87) PCT Pub. No.: WO2019/065664
PCT Pub. Date: Apr. 4, 2019

(65) Prior Publication Data
US 2020/0282840 A1    Sep. 10, 2020

(30) Foreign Application Priority Data
Sep. 26, 2017    (JP) .............................. JP2017-184275

(51) Int. Cl.
*B60L 7/26*        (2006.01)
*B60T 8/17*        (2006.01)
(Continued)

(52) U.S. Cl.
CPC    *B60L 7/26* (2013.01); *B60T 8/17* (2013.01); *B60T 8/1755* (2013.01);
(Continued)

(58) Field of Classification Search
CPC ...... B60L 7/26; B60T 13/586; B60T 2250/03; B60T 8/17; B60T 2270/604; B60T 8/441;
(Continued)

(56) References Cited

U.S. PATENT DOCUMENTS 8,500,217 B2 *    8/2013    Isono ...................... B60T 8/441
                                                        303/115.4
2008/0300763 A1 *    12/2008    Mori ...................... B60T 8/4063
                                                        701/70

(Continued)

FOREIGN PATENT DOCUMENTS

CN         103998304 A         8/2014
JP         2008230362 A *      10/2008
(Continued)

*Primary Examiner* — Pamela Rodriguez
(74) *Attorney, Agent, or Firm* — Oblon, McClelland, Maier & Neustadt, L.L.P.

(57) ABSTRACT

A brake control mounted in a vehicle equipped with a regenerative generator on either the front wheels or the rear wheels including a first pressure adjusting unit that adjusts a liquid pressure generated by a first electric motor to a first liquid pressure and provides the first liquid pressure to wheel cylinders of wheels on one side; and a second pressure adjusting unit that is configured by a fluid pump, which is driven by a second electric motor, and a pressure adjusting valve, and that performs adjustment to increase the first liquid pressure to a second liquid pressure and provides the second liquid pressure to wheel cylinders of wheels on the other side.

5 Claims, 7 Drawing Sheets

(51) Int. Cl.
*B60T 8/1755* (2006.01)
*B60T 13/58* (2006.01)

(52) U.S. Cl.
CPC ......... *B60T 13/586* (2013.01); *B60T 2250/03* (2013.01); *B60T 2270/604* (2013.01)

(58) Field of Classification Search
CPC .... B60T 8/4077; B60T 8/1755; B60T 13/146; B60T 13/20; B60T 13/68; B60T 13/686
See application file for complete search history.

(56) References Cited

U.S. PATENT DOCUMENTS

| | | | |
|---|---|---|---|
| 2014/0346851 A1* | 11/2014 | Sonoda | B60L 50/15 303/3 |
| 2016/0082937 A1* | 3/2016 | Nakaoka | B60T 7/042 303/15 |
| 2018/0037203 A1 | 2/2018 | Maruo et al. | |
| 2020/0247379 A1* | 8/2020 | Yamamoto | B60T 7/042 |

FOREIGN PATENT DOCUMENTS

| | | | |
|---|---|---|---|
| JP | 2016-144952 A | | 8/2016 |
| JP | WO-2018043110 A1 | * | 3/2018 |

* cited by examiner

FIG. 2

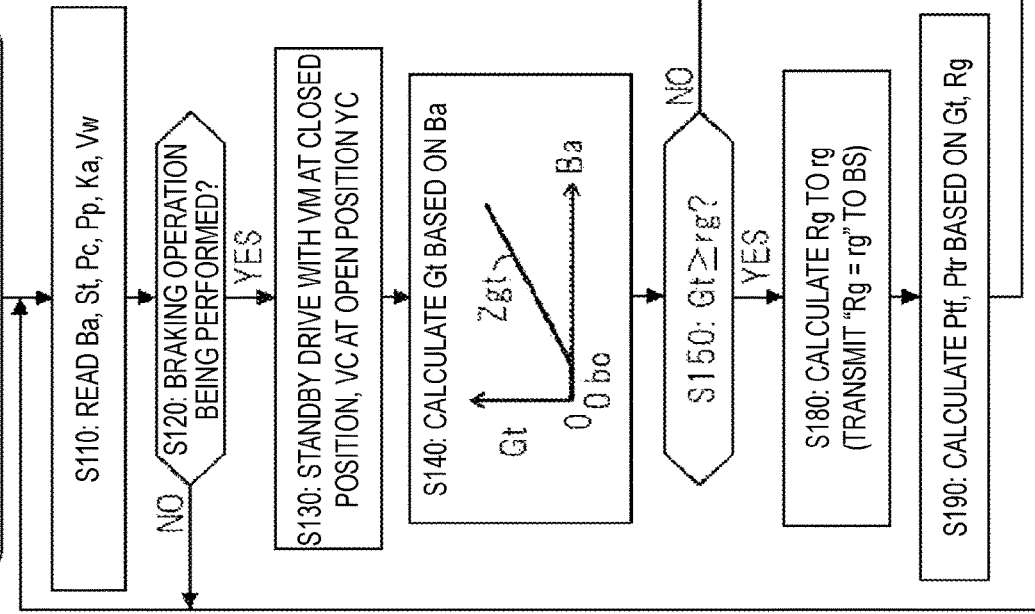

PRESSURE ADJUSTING CONTROL PROCESS: REGENERATIVE COOPERATIVE CONTROL

S110: READ Ba, St, Pc, Pp, Ka, Vw

S120: BRAKING OPERATION BEING PERFORMED?

S130: STANDBY DRIVE WITH VM AT CLOSED POSITION, VC AT OPEN POSITION YC

S140: CALCULATE Gt BASED ON Ba

S150: Gt ≥ rg?

S160: DETERMINE Rg AS Gt (TRANSMIT "Rg = Gt" TO BS)

S170: Ptf = 0, Ptr = 0

S180: CALCULATE Rg TO rg (TRANSMIT "Rg = rg" TO BS)

S190: CALCULATE Ptf, Ptr BASED ON Gt, Rg

S200: CALCULATE Nt BASED ON Pt

S210: ROTATION NUMBER SERVO CONTROL MC

S220: LIQUID PRESSURE SERVO CONTROL UC

S230: DRIVE ML

S240: SERVO CONTROL UPf (UPr)

WHEN Fgf IS RELATIVELY LARGER THAN Fgr

WHEN Fgr IS RELATIVELY LARGER THAN Fgf

VEHICLE BRAKE CONTROL DEVICE

TECHNICAL FIELD

The present invention relates to a vehicle brake control device.

BACKGROUND ART

Patent Literature 1 describes that, for the purpose of "providing a liquid pressure control device and a brake system in which increase in cost is suppressed", "a liquid pressure source provided inside a housing and adapted to generate working liquid pressure with respect to a liquid pressure generating unit provided on the wheel through an oil passage, a switching electromagnetic valve provided integrally in the housing to permit inflow of brake fluid into the stroke simulator that generates a reaction force of the brake pedal operation of the driver provided separately from the housing, and a control unit provided integrally in the housing to drive the liquid pressure source and the switching electromagnetic valve are provided".

The device of Patent Literature 1 is applied as a motor for driving wheels to a brake system of an electric vehicle such as a hybrid vehicle equipped with an electric motor (generator) in addition to an engine, an electric automobile equipped with only an electric motor (generator), and the like. In such an electric vehicle, a regenerative braking device including a motor (generator) can execute regenerative braking for braking the vehicle by regenerating kinetic energy of the vehicle into electric energy.

The device of Patent Literature 1 achieves a so-called regenerative cooperative control (cooperation between regenerative braking and friction braking). However, in the device of Patent Literature 1, the same liquid pressure is applied to the wheel cylinders of all the wheels regardless of the presence or absence of a regenerative generator. Thus, a resultant force of the regenerative braking force and the friction braking force is generated on the wheels including the generator, and only the friction braking force is generated on the wheels not including the generator.

From the viewpoint of traveling stability of the vehicle, the front wheel braking force and the rear wheel braking force need to be appropriately distributed in consideration of the ground load (perpendicular force) caused by vehicle deceleration. On the other hand, in the viewpoint of energy regeneration, it is preferable that the maximum energy that the generator can generate is regenerated (i.e., the maximum regenerative braking force is achieved). Therefore, there is a demand for a vehicle brake control device in which regenerative cooperative control is performed that can achieve both vehicle stability and energy regeneration at a high level.

CITATIONS LIST

Patent Literature

Patent Literature 1: Japanese Unexamined Patent Publication No. 2016-144952

SUMMARY OF INVENTION

Technical Problems

An object of the present invention is to provide a brake control device capable of achieving regenerative cooperative control in which vehicle stability and energy regeneration are both achieved at a high level.

Solutions to Problems

A vehicle brake control device according to the present invention is mounted on a vehicle provided in which a regenerative generator (GN) is provided on a wheel (WHg) of either one of the front wheels (WHf) and the rear wheels (WHr).

The vehicle brake control device according to the present invention includes a first pressure adjusting unit (YC) that adjusts a liquid pressure generated by a first electric motor (MC, MZ, MD) to a first liquid pressure (Pc); and a second pressure adjusting unit (YD) that is configured by a fluid pump (QL) driven by a second electric motor (ML) and a pressure adjusting valve (UP), and that performs adjustment to increase the first liquid pressure (Pc) to a second liquid pressure (Pp).

In the vehicle brake control device according to the present invention, the first pressure adjusting unit (YC) applies the first liquid pressure (Pc) to a wheel cylinder (CWg) of the wheel (WHg) on the one side, and the second pressure adjusting unit (YD) applies the second liquid pressure (Pp) to a wheel cylinder (CWt) of a wheel (WHt) on the other side different from the wheel (WHg) on one side.

According to the above configuration, the liquid pressure Pwf of the wheel cylinder CWf of the front wheel and the liquid pressure Pwr of the wheel cylinder CWr of the rear wheel can be adjusted independently.

A vehicle brake control device according to the present invention is mounted on a vehicle in which a front wheel regenerative generator (GNf) is provided on a front wheel (WHf) and a rear wheel regenerative generator (GNr) is provided on a rear wheel (WHr).

The vehicle brake control device according to the present invention includes a first pressure adjusting unit (YC) that adjusts a liquid pressure generated by a first electric motor (MC, MZ, MD) to a first liquid pressure (Pc); and a second pressure adjusting unit (YD) that is configured by a fluid pump (QL) driven by a second electric motor (ML) and a pressure adjusting valve (UP), and that performs adjustment to increase the first liquid pressure (Pc) to a second liquid pressure (Pp).

In the vehicle brake control device according to the present invention, when a front wheel regenerative braking force (Fgf) by the front wheel regenerative generator (GNf) is zero and a rear wheel regenerative braking force (Fgf) by the rear wheel regenerative generator (GNr) is zero, and a relationship between a front wheel braking force (Ff) of the front wheel (WHf) and a rear wheel braking force (Fr) of the rear wheel (WHr) is set as a reference characteristic (Cb), the first pressure adjusting unit (YC) applies the first liquid pressure (Pc) to a wheel cylinder (CW) of the wheel corresponding to a relatively larger one of the front wheel regenerative braking force (Fgf) and the rear wheel regenerative braking force (Fgr) with respect to the reference characteristic (Cb), and the second pressure adjusting unit (YD) applies the second liquid pressure (Pp) to a wheel cylinder (CW) of a wheel corresponding to a relatively smaller one of the front wheel regenerative braking force (Fgf) and the rear wheel regenerative braking force (Fgr) with respect to the reference characteristic (Cb).

With the above configuration as well, the liquid pressures Pwf and Pwr of the front and rear wheel braking systems are independently controlled, so that the distribution ratio of the front wheel and rear wheel braking forces Ff and Fr is optimized, the vehicle stability is maintained, and a sufficient regenerable energy amount can be secured.

BRIEF DESCRIPTION OF DRAWINGS

FIG. 2 is a control flowchart describing a process of pressure adjusting control including regenerative cooperative control.

DESCRIPTION OF EMBODIMENTS

Figure 1:
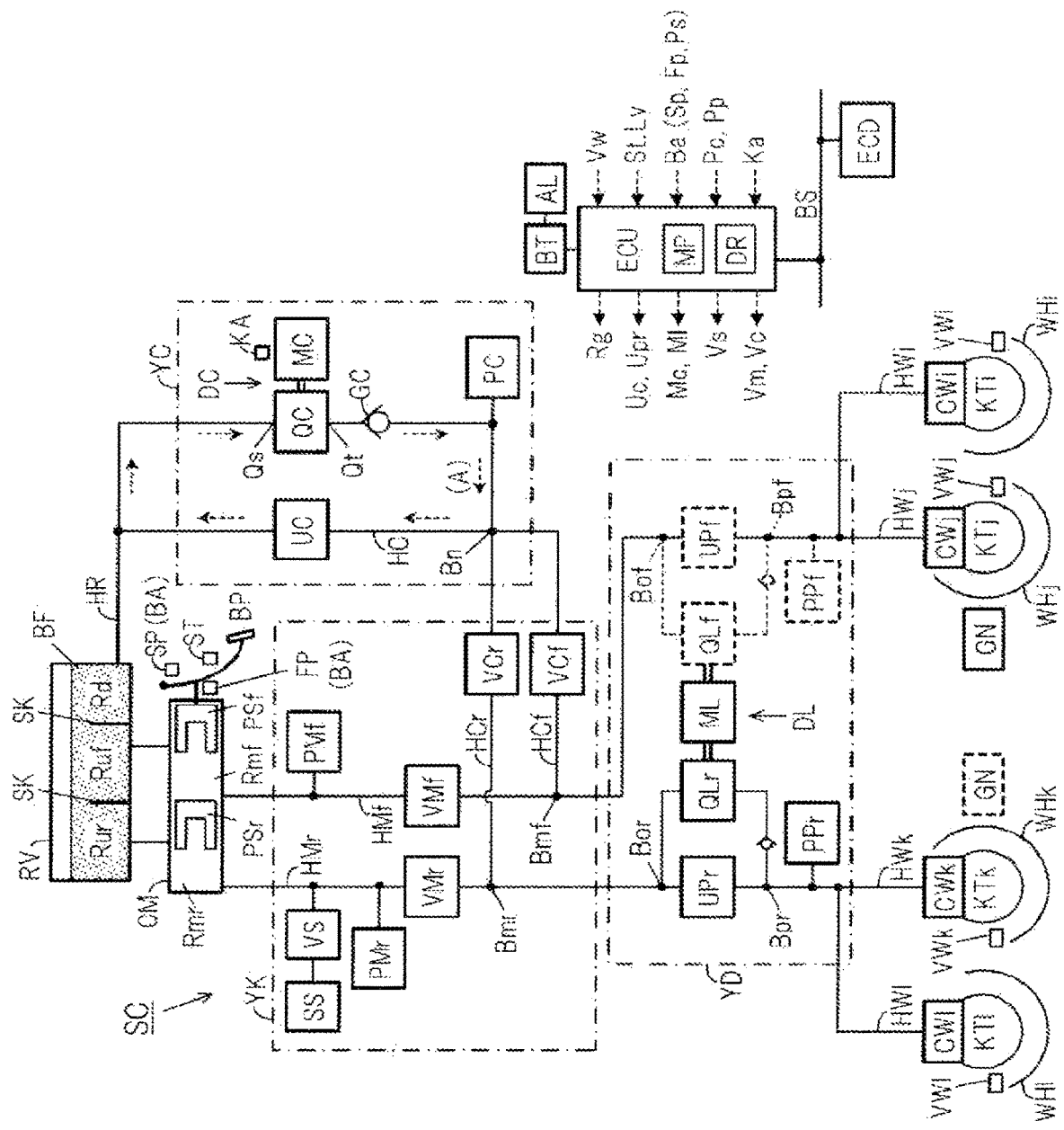
FIG. 1 is an overall configuration view describing a first embodiment of a brake control device SC for a vehicle according to the present invention.

<Symbols of Configuring Members, Etc., and Subscripts at the End of the Symbols>

In the following description, configuring members, calculation processes, signals, characteristics, and values having the same symbol such as "ECU" have the same functions. Subscripts "i" to "l" added to the end of various symbols are comprehensive symbols indicating which wheel they relate to. Specifically, "i" indicates a right front wheel, "j" indicates a left front wheel, "k" indicates a right rear wheel, and "l" indicates a left rear wheel. For example, each of the four wheel cylinders are described as wheel cylinder CWi of the right front wheel, wheel cylinder CWj of the left front wheel, wheel cylinder CWk of the right rear wheel, and wheel cylinder CWl of the left rear wheel. Furthermore, the subscripts "i" to "l" at the end of the symbols can be omitted. When the subscripts "i" to "l" are omitted, each symbol represents a generic name of each of the four wheels. For example, "WH" represents each wheel, and "CW" represents each wheel cylinder.

The subscripts "f" and "r" added to the end of various symbols are comprehensive symbols indicating which of the two braking systems, the front and rear wheels, they relate to. Specifically, "f" indicates the front wheel system, and "r" indicates the rear wheel system. For example, the master cylinder valve VM is described as a front wheel master cylinder valve VMf and a rear wheel master cylinder valve VMr. Furthermore, the subscripts "f" and "r" at the end of the symbols can be omitted. When the subscripts "f" and "r" are omitted, each symbol represents a generic name of each of the two braking systems. For example, "VM" represents the master cylinder valve in the front and rear braking systems.

The operation of the brake control device SC is in an appropriate state, and the braking performed by the brake control device SC is referred to as "control braking". When the operation of the brake control device SC is in a malfunction state, braking only by the driver's operation force is referred to as "manual braking". Therefore, in manual braking, the brake control device SC is not used.

First Embodiment of Vehicle Brake Control Device According to the Present Invention A first embodiment of the brake control device SC according to the present invention will be described with reference to an overall configuration view of FIG. 1. In a general vehicle, fluid passages of two systems are employed to secure redundancy. The fluid passage is a passage for moving the brake liquid BF which is the working fluid of the brake control device, and corresponds to a braking pipe, a fluid path of a fluid unit, a hose, and the like. The inside of the fluid passage is filled with the brake liquid BF. In the fluid passage, the side closer to the reservoir RV (the side farther from the wheel cylinder CW) is referred to as the "upstream side" or "upper part", and the side closer to the wheel cylinder CW (the side farther from the reservoir RV) is referred to as the "downstream side" or "lower part".

The front wheel system of the fluid passages of two systems is connected to the wheel cylinder CWi and CWj (also referred to as "CWf") of the front wheel. The rear wheel system of the fluid passages of two systems is connected to the wheel cylinder CWk and CWl (also referred to as "CWr") of the rear wheel. That is, a so-called front-rear type (also referred to as "H type") is adopted for the fluid passages of two systems.

The vehicle is a hybrid vehicle including an electric motor GN for driving, or an electric automobile. The electric motor GN for driving also functions as a generator (power generator) for energy regeneration. For example, the generator GN is provided on the front wheel WHf. Here, the wheels provided with the generator GN are referred to as "regenerative wheels WHg", and the wheels not provided with the generator GN are referred to as "non-regenerative wheels WHt". Therefore, the front wheel WHf is a regenerative wheel WHg (corresponding to "wheel on one side"), and the rear wheel WHr is a non-regenerative wheel WHt (corresponding to "wheel on other side").

In the brake control device SC, so-called regenerative cooperative control (cooperation between regenerative braking and friction braking) is executed. The vehicle including the brake control device SC includes a brake operation member BP, a wheel cylinder CW, a reservoir RV, and a wheel speed sensor VW.

The brake operation member (e.g., brake pedal) BP is a member operated by the driver to decelerate the vehicle. The braking torque of the wheel WH is adjusted, and the braking force F (generic name of Ff, Fr) is generated at the wheel WH by operating the brake operation member BP. Specifically, a rotating member (e.g., brake disc) KT is fixed to the wheel WH of the vehicle. The brake caliper is arranged so as to sandwich the rotating member KT.

The brake caliper is provided with the wheel cylinder CW. As the pressure (brake liquid pressure) Pw of the brake liquid BF in the wheel cylinder CW is increased, the friction member (e.g., brake pad) is pressed against the rotating member KT. Since the rotating member KT and the wheel WH are fixed to rotate integrally, a braking torque (friction braking force Fp) is generated at the wheel WH by the frictional force generated at this time.

The wheel cylinder provided on the regenerative wheel WHg (wheel including the generator GN) is referred to as "regenerative wheel cylinder CWg". Furthermore, the wheel cylinder provided on the non-regenerative wheel WHt (wheel not including the generator GN) is referred to as "non-regenerative wheel cylinder CWt". Since the generator GN is provided on the front wheel WHf, the wheel cylinders CWf (CWi, CWj) of the front wheels is a regenerative wheel cylinder CWg, and the wheel cylinders CWr (CWk, CWl) of the rear wheels is a non-regenerative wheel cylinder CWt.

The reservoir (atmospheric pressure reservoir) RV is a tank for the working fluid, in which the brake liquid BF is stored. The lower part of the reservoir RV is partitioned by a partition plate SK into a master reservoir chamber Ru (Ruf, Rur) connected to a master cylinder chamber Rm (Rmf, Rmr), and a pressure adjusting reservoir chamber Rd connected to a first pressure adjusting unit YC. In a state in which the reservoir RV is filled with the brake liquid BF, the liquid level of the brake liquid BF is above the height of the partition plate SK. For this reason, the brake liquid BF can freely move between the master reservoir chamber Ru and the pressure adjusting reservoir chamber Rd beyond the partition plate SK. On the other hand, when the amount of brake liquid BF in the reservoir RV decreases and the liquid level of the brake liquid BF becomes lower than the height of the partition plate SK, the master reservoir chamber Ru and the pressure adjusting reservoir chamber Rd become independent reservoirs.

The master cylinder CM is mechanically connected to the brake operation member BP through a brake rod, a clevis (U-shaped joint) and the like. The master cylinder CM is a so-called tandem type having two chambers (liquid pressure chambers) Rmf and Rmr. The front wheel master cylinder chamber Rmf is partitioned by the inner wall (cylindrical surface) of the master cylinder CM, the rear end of the first master piston PSf, and the front end of the second master piston PSr, and is communicated to the front wheel reservoir chamber Ruf when the brake operation member BP is not operated (at the time of non-braking). The rear wheel master cylinder chamber Rmr is defined by the inner wall (cylindrical surface and bottom surface) of the master cylinder CM and the rear end of the second master piston PSr, and is communicated to the rear wheel reservoir chamber Rur at the time of non-braking.

When the brake operation member BP is operated, the first and second pistons PSf and PSr in the master cylinder CM are pushed to move forward. The forward movement causes the master cylinder chamber Rm (Rmf, Rmr) to be shut off from the reservoir RV (particularly, the master reservoir chamber Ruf, Rur). Furthermore, when the operation of the brake operation member BP is increased, the volume of the master cylinder chamber Rm decreases, and the brake liquid BF is pumped from the master cylinder CM toward the wheel cylinder CW.

Each wheel WH includes a wheel speed sensor VW to detect the wheel speed Vw. The signal of the wheel speed Vw is used for braking control independent for each wheel such as anti-skid control (control for suppressing excessive deceleration slip of the wheel), vehicle stabilization control (control for suppressing excessive oversteer, understeer behavior), and the like. Each wheel speed Vw detected by the wheel speed sensor VW is input to a controller ECU. In the controller ECU, the vehicle body speed Vx is calculated based on the wheel speed Vw.

<<Brake Control Device SC>>

The brake control device SC includes an operation amount sensor BA, an operation switch ST, a stroke simulator SS, a simulator electromagnetic valve VS, a master cylinder electromagnetic valve VM, a first pressure adjusting unit YC, a separation electromagnetic valve VC, a second pressure adjusting unit YD, and a controller ECU. The inside of the brake control device SC is made to a liquid-tight state by the brake liquid BF.

The operation amount sensor BA is provided on the brake operation member BP. The operation amount Ba of the brake operation member (brake pedal) BP by the driver is detected by the operation amount sensor BA. As the brake operation amount sensor BA, at least one of a master cylinder liquid pressure sensor PM that detects the liquid pressure (master cylinder liquid pressure) Pm of a master cylinder CM, an operation displacement sensor SP that detects the operation displacement Sp of the brake operation member BP, and an operation force sensor FP that detects the operation force Fp of the brake operation member BP is adopted. That is, as the brake operation amount Ba, at least one of the master cylinder liquid pressure Pm, the brake operation displacement Sp, and the brake operation force Fp is detected by the operation amount sensor BA. The brake operation amount Ba is input to a controller ECU.

An operation switch ST is provided on the brake operation member BP. The operation switch ST detects whether the driver operated the brake operation member BP. When the brake operation member BP is not operated (that is, at the time of non-braking), an off signal is output as the operation signal St by the brake operation switch ST. On the other hand, when the brake operation member BP is operated (that is, at the time of braking), an ON signal is output as the operation signal St. The brake operation signal St is input to the controller ECU.

A stroke simulator (also simply referred to as a simulator) SS is provided to cause the brake operation member BP to generate an operation force Fp. A piston and an elastic body (e.g., compression spring) are provided inside the simulator SS. The brake liquid BF is moved from the master cylinder CM into the simulator SS, and the piston is pushed by the brake liquid BF flowing in. A force is exerted on the piston in a direction of inhibiting the inflow of the brake liquid BF by the elastic body. The elastic body forms an operation force Fp when the brake operation member BP is operated.

The master cylinder CM is connected to wheel cylinder CW by a master cylinder fluid passage HM. A master cylinder valve VM is provided in the middle of the master cylinder fluid passage HM. The master cylinder valve VM is a two-position electromagnetic valve (also referred to as an "on/off valve") having an open position (communicated state) and a closed position (shut-off state). The master cylinder valve VM is controlled by a drive signal Vm from the controller ECU. At the time of non-braking or at the time of manual braking, the master cylinder valve VM is set to the open position, and the master cylinder CM and the wheel cylinder CW are in a communicated state through the master cylinder fluid passage HM. At the time of control braking, the master cylinder valve VM is set to the closed position, and the master cylinder CM and the wheel cylinder CW are in a shut-off state (non-communicated state). A normally-open electromagnetic valve is employed as the master cylinder valve VM.

On the upstream side of the master cylinder valve VM, a simulator valve VS is provided between the master cylinder chamber Rm in the master cylinder CM and the simulator SS. The simulator valve VS is a two-position electromagnetic valve (on/off valve) having an open position and a closed position. The simulator valve VS is controlled by a drive signal Vs from the controller ECU. At the time of manual braking, the simulator valve VS is set to the closed position, and the master cylinder CM and the simulator SS are in a shut-off state. In this case, the brake liquid BF from the master cylinder CM is not consumed by the simulator SS. At the time of control braking, the simulator valve VS is set to the open position, and the master cylinder CM and the simulator SS are in a communicated state. In this case, the operation characteristic of the brake operation member BP (relationship between the operation displacement Sp and the operation force Fp) is formed by the simulator SS. A normally-closed electromagnetic valve is employed as the simulator valve VS. When the volume of the master cylinder chamber Rm is sufficiently large, the simulator valve VS can be omitted.

[First Pressure Adjusting Unit YC (Reflux Type)]

The first pressure adjusting unit YC includes a first electric pump DC, a check valve GC, a first pressure adjusting valve UC, and a first adjusted liquid pressure sensor PC.

The first electric pump DC is configured by a set of one first electric motor MC and one first fluid pump QC. In the first electric pump DC, the first electric motor MC and the first fluid pump QC are fixed such that the first electric motor MC and the first fluid pump QC rotate integrally. The first electric pump DC (particularly, the first electric motor MC) is a power source for increasing the brake liquid pressure Pw at the time of control braking. The electric motor MC is controlled by the controller ECU.

For example, a three-phase brushless motor is employed as the first electric motor MC. The brushless motor MC is provided with a rotation angle sensor KA that detects a rotor position (rotation angle) Ka. A switching element of a bridge circuit is controlled based on the rotation angle (actual value) Ka, and the electric motor MC is driven. The direction of the electrification amount of the coils of each of the three phases (U phase, V phase, W phase) (i.e., excitation direction) is sequentially switched, and the brushless motor MC is rotationally driven. A drive circuit DR is provided with an electrification amount sensor that detects an actual electrification amount Ia (generic name of each phase) of the electric motor MC. A current sensor is provided as an electrification amount sensor, and detects a supply current Ia to the electric motor MC.

A suction port Qs of the first fluid pump QC is connected to the reservoir RV (particularly, the pressure adjusting reservoir chamber Rd) through the reservoir fluid passage HR. A pressure adjusting fluid passage HC is connected to a discharge port Qt of the fluid pump QC. By driving the electric pump DC (particularly, the fluid pump QC), the brake liquid BF is suctioned from the reservoir fluid passage HR through the suction port Qs, and discharged from the discharge port Qt to the pressure adjusting fluid passage HC. For example, a gear pump is employed as the first fluid pump QC.

A check valve GC (also referred to as a "check valve") is interposed in the pressure adjusting fluid passage HC. For example, a check valve GC is provided near the discharge portion Qt of the fluid pump QC. The check valve GC allows the brake liquid BF to move from the reservoir fluid passage HR to the pressure adjusting fluid passage HC, but the movement from the pressure adjusting fluid passage HC to the reservoir fluid passage HR (i.e., backflow of the brake liquid BF) is inhibited. That is, the electric pump DC is rotated only in one direction.

The first pressure adjusting valve UC is connected to the pressure adjusting fluid passage HC and the reservoir fluid passage HR. The first pressure adjusting valve UC is a linear type electromagnetic valve ("proportional valve" or "differential pressure valve") in which the valve opening amount (lift amount) is continuously controlled based on the energized state (e.g., supply current). The pressure adjusting valve UC is controlled by the controller ECU based on the drive signal Uc. A normally-open electromagnetic valve is employed as the pressure adjusting valve UC.

The brake liquid BF is pumped from the reservoir fluid passage HR through the suction port Qs of the first fluid pump QC, and is discharged from the discharge port Qt. Then, the brake liquid BF is returned to the reservoir fluid passage HR through the check valve GC and the pressure adjusting valve UC. In other words, a reflux path (a fluid passage in which the flow of the brake liquid BF again returns to the original flow) is formed by the reservoir fluid passage HR and the pressure adjusting fluid passage HC, and the check valve GC and the pressure adjusting valve UC are interposed in the reflux path.

When the first electric pump DC is operating, the brake liquid BF is refluxed in the order of "HR→QC (Qs→Qt) →GC→UC→HR" as shown by a broken arrow (A). When the first pressure adjusting valve UC is in a fully open state (at the time of non-energization as it is a normally-open type), the liquid pressure (adjusted liquid pressure) Pc in the pressure adjusting fluid passage HC is low, and is approximately "0 (atmospheric pressure)". When the electrification amount to the first pressure adjusting valve UC is increased and the reflux path is narrowed by the pressure adjusting valve UC, the adjusted liquid pressure Pc is increased. In the first pressure adjusting unit YC, the reflux of the brake liquid BF formed by the electric pump DC is adjusted by the pressure adjusting valve UC to generate an adjusted liquid pressure (corresponding to "first liquid pressure") Pc. This pressure adjusting method is called "reflux type". In the first pressure adjusting unit YC, a first adjusted liquid pressure sensor PC is provided in the pressure adjusting fluid passage HC (particularly, between the check valve GC and the pressure adjusting valve UC) so as to detect the adjusted liquid pressure Pc.

The pressure adjusting fluid passage HC is branched at a branch portion Bn into a front wheel pressure adjusting fluid passage HCf and a rear wheel pressure adjusting fluid passage HCr. The front wheel pressure adjusting fluid passage HCf is connected to the front wheel master cylinder fluid passage HMf at a downstream portion Bmf of the front wheel master cylinder valve VMf. The rear wheel pressure adjusting fluid passage HCr is connected to the rear wheel master cylinder fluid passage HMr at a downstream portion Bmr of the rear wheel master cylinder valve VMr. Therefore, the adjusted liquid pressure Pc is introduced into the wheel cylinders CWf and CWr of the front wheel and the rear wheel through the front and rear wheel pressure adjusting fluid passages HCf and HCr and the front and rear wheel master cylinder fluid passages HiMf and HMr. That is, the brake liquid BF is pressurized in the downstream portion of the master cylinder CM by the first pressure adjusting unit YC. This pressurization method is referred to as "master cylinder downstream pressurization".

Separation valves VCf and VCr are provided in the middle of the pressure adjusting fluid passages HCf and HCr. The separation valve VC is a two-position electromagnetic valve (on/off valve) having an open position and a closed position. The separation valve VC is controlled by a drive signal Vc from the controller ECU. At the time of non-braking or at the time of manual braking, the separation valve VC is set to the closed position, and the movement of the brake liquid BF from the master cylinder CM to the first pressure adjusting unit YC (particularly, the pressure adjusting valve UC) is shut off. Thus, the brake liquid BF sent from the master cylinder CM at the time of manual braking is introduced into the wheel cylinder CW. At the time of control braking, the separation valve VC is set to the open position. At this time, since the master cylinder valve VM is at the closed position, the adjusted liquid pressure Pc is introduced (supplied) from the first pressure adjusting unit YC to the wheel cylinder CW. A normally-closed electromagnetic valve is employed as the separation valve VC.

[Second Pressure Adjusting Unit YD]

The generator GN is provided on the front wheel WHf, but the second pressure adjusting unit YD is provided in the braking system for the rear wheel WHr not provided with the generator GN. The second pressure adjusting unit YD is provided on the downstream side of the rear wheel master cylinder valve VMr (e.g., between the portion Bmr and the wheel cylinder CWr of the rear wheel). The adjusted liquid pressure (corresponding to the "first liquid pressure") Pc is increased to the rear wheel output liquid pressure (corresponding to the "second liquid pressure") Ppr by the second pressure adjusting unit YD so that the distribution of the front wheel braking force Ff and the rear wheel braking force Fr is optimized, and the output liquid pressure Ppr is applied to the wheel cylinder CWr of the rear wheel. At this time, the adjusted liquid pressure Pc is applied to the wheel cylinder CWf of the front wheel. Therefore, the rear wheel brake liquid pressure Pwr is larger than the front wheel brake liquid pressure Pwf.

The pressure adjusting control by the second pressure adjusting unit YD is referred to as "independent control" in the regenerative cooperative control. That is, in a vehicle having the generator GN on the front wheel WHf, the independent control independently controls the front wheel system and the rear wheel system by the adjusted liquid pressure Pc being applied to the wheel cylinder CWf of the front wheel, and the output liquid pressure Ppr increased from the adjusted liquid pressure Pc being applied to the wheel cylinder CWr of the rear wheel.

The second pressure adjusting unit YD is configured by a second electric pump DL, a rear wheel second pressure adjusting valve UPr, and a rear wheel output liquid pressure sensor PPr. The second electric pump DL is configured by a set of a second electric motor ML and a second fluid pump QL. In the second electric pump DL as well, similarly to the first electric pump DC, the second electric motor ML and the second fluid pump QL are fixed so as to rotate integrally. The second electric pump DL (particularly, the second electric motor ML) is a power source for increasing the adjusted liquid pressure Pc to the output liquid pressure Ppr. The electric motor Mt is controlled by the controller ECU based on the drive signal Ml.

The suction port of the second fluid pump QLr is connected to the upstream portion Bor of the pressure adjusting valve UPr in the rear wheel master cylinder fluid passage HMr. The discharge port of the second fluid pump QLr is connected to the downstream portion Bpr of the pressure adjusting valve UPr in the rear wheel master cylinder fluid passage HMr. A check valve is provided at the discharge portion of the fluid pump QLr to inhibit the backflow of the brake liquid BF. When the electric pump DL (particularly, the fluid pump QL) is driven, a reflux of the brake liquid BF is formed as "Bor→QLr→Bpr→UPr→Bor". For example, a gear pump is employed as the second fluid pump QLr.

Similar to the first pressure adjusting valve UC, the second pressure adjusting valve (also referred to as a "charge valve") UPr for the rear wheel is a normally-open linear type electromagnetic valve (proportional valve) in which the valve opening amount is continuously controlled based on the electrification amount (e.g., supply current). The rear wheel charge valve UPr is controlled by the controller ECU based on the drive signal Up. When the normally-open type rear wheel charge valve (rear wheel second pressure adjusting valve) UPr is not energized and is fully open, the liquid pressure (output liquid pressure) Ppr on the downstream side of the rear wheel charge valve UPr matches the adjusted liquid pressure Pc. When the electrification amount to the rear wheel charge valve UPr is increased and the reflux is narrowed by the rear wheel charge valve UPr, the output liquid pressure Ppr is increased from the adjusted liquid pressure Pc by the orifice effect. A rear wheel output liquid pressure sensor PPr is provided at the downstream portion of the rear wheel charge valve UPr so as to detect the output liquid pressure Ppr.

An electronic control unit (also referred to as "controller") ECU is configured by an electric circuit substrate on which a microprocessor MP or the like is mounted and a control algorithm programmed in the microprocessor MP. The first and second electric motors MC, ML, and various electromagnetic valves VM, VS, VC, UC and UPr are controlled based on the brake operation amount Ba, the operation signal St, the adjusted liquid pressure Pc, and the output liquid pressure Ppr by the controller ECU. Specifically, the drive signals Vm, Vs, Vc, Uc, Upr for controlling various electromagnetic valves VM, VS, VC, UC, UPr are calculated based on the control algorithm in the microprocessor MP. Similarly, the drive signals Mc and Ml for controlling the electric motors MC and ML are calculated. The electromagnetic valves VM, VS, VC, UC, UPr, and the electric motors MC, ML are driven based on these drive signals Vm, Vs, Vc, Uc, Upr, Mc, Ml.

The controller ECU is network connected to another electronic control unit (controller) through an in-vehicle communication bus BS. The regeneration amount Rg (target value) is transmitted by the controller ECU to the driving controller ECD so as to execute regenerative cooperative control. The "regeneration amount Rg" is a state quantity representing the magnitude of the regenerative brake generated by the driving motor (also regenerative generator) GN. Power is supplied from a power generator AL mounted on the vehicle and a storage battery BT to the controller ECU.

The controller ECU includes a drive circuit DR for driving the electromagnetic valves VM, VS, VC, UC, UPr and the electric motors MC, ML. In the drive circuit DR, a bridge circuit is formed by switching elements (power semiconductor devices such as MOS-FET, IGBT etc.) to drive the electric motor MC. Based on the motor drive signals Mc, Ml, the energized state of each switching element is controlled and the outputs of the electric motors MC and ML are controlled. Furthermore, in the drive circuit DR, the excitation states are controlled based on the drive signals Vm, Vs, Vc, Uc, Upr so as to drive the electromagnetic valves VM, VS, VC, UC, UPr.

<Process of Pressure Adjusting Control Including Regenerative Cooperative Control>

With reference to the control flowchart of FIG. 2, the process of pressure adjusting control including regenerative cooperative control will be described. "Pressure adjusting control" is a drive control of the first and second electric motors MC and ML and the first and second pressure adjusting valves UC and UPr for adjusting the adjusted liquid pressure Pc and the output liquid pressure Ppr. The control algorithm is programmed in the controller ECU.

In step S110, the brake operation amount Ba, the operation signal St, the adjusted liquid pressure Pc, the output liquid pressure Pp, the rotation angle Ka, and the wheel speed Vw are read. The operation amount Ba is detected by an operation amount sensor BA (master cylinder liquid pressure sensor PM, operation displacement sensor SP, etc.). The operation signal St is detected by an operation switch ST provided on the brake operation member BP. The adjusted liquid pressure Pc is detected by an adjusted liquid pressure sensor PC provided in the pressure adjusting fluid passage HC. The rear wheel output liquid pressure Ppr is detected by a rear wheel output liquid pressure sensor PPr. The motor rotation angle Ka is detected by a rotation angle sensor KA provided on the electric motor MC. The wheel speed Vw is detected by a wheel speed sensor VW provided on each wheel WH.

In step S120, "whether or not braking operation is being performed" is determined based on at least one of the brake operation amount Ba and the brake operation signal St. For example, when the operation amount Ba is greater than or equal to a predetermined value bo, positive determination is made in step S120 and the process proceeds to step S130. On the other hand, when "Ba<bo", negative determination is made in step S120 and the process returns to step S110. Here, the predetermined value bo is a constant set in advance that corresponds to the play of the brake operation member BP. When the operation signal St is on, the process proceeds to step S130, and when the operation signal St is off, the process returns to step S110.

In step S130, the normally-open master cylinder valve VM is set to the closed position, and the normally-closed separation valve VC is set to the open position. Furthermore, the normally-closed simulator valve VS is set to the open position. Thus, the master cylinder CM is separated from the wheel cylinder CW, and the wheel cylinder CW is brought into a state capable of being pressurized by the first pressure adjusting unit YC. Furthermore, the simulator SS is connected to the master cylinder chamber Rm, and the operation characteristics of the brake operation member (brake pedal) BP are formed by the simulator SS.

In step S130, the first pressure adjusting unit YC is driven in standby so that the second pressure adjusting unit YD can suction the brake liquid BF. Specifically, the first electric pump DC is rotated and the first pressure adjusting valve UC is tightened so that the adjusted liquid pressure Pc becomes slightly higher than the atmospheric pressure to an extent it does not affect the deceleration of the vehicle. In step S130, first pressure adjusting unit YC is in a so-called standby state.

In step S140, a target deceleration Gt is calculated based on the operation amount Ba. The target deceleration Gt is a target value of the deceleration in decelerating the vehicle. According to the calculation map Zgt, the target deceleration Gt is determined to be "0" when the operation amount Ba is in the range from "0" to the predetermined value bo, and is calculated to monotonically increase from "0" as the operation amount Ba increases when the operation amount Ba is greater than or equal to the predetermined value bo.

In step S150, "whether or not the target deceleration Gt is greater than or equal to a predetermined regeneration amount rg" is determined based on the target deceleration Gt. The predetermined regeneration amount rg is a threshold value for the vehicle deceleration that can be achieved by regenerative braking. For example, the predetermined regeneration amount rg is set in advance as a constant. Furthermore, the predetermined regeneration amount rg can be set based on the state of the regenerative generator GN or the storage battery BT. If "Gt<rg" and negative determination is made in step S140, the process proceeds to step S160. On the other hand, if "Gt≥rg" is satisfied, the process proceeds to step S180.

In step S160, the regeneration amount Rg (value corresponding to the vehicle deceleration) is determined to match the target deceleration Gt. Then, "Rg=Gt" is transmitted from the controller ECU to the driving controller ECD through the communication bus BS. In step S170, the target liquid pressures Ptf and Ptr of the front and rear wheels are calculated to "0". That is, the target value of the adjusted liquid pressure Pc is determined to be "0". In this case, the vehicle deceleration does not employ friction braking, and the target deceleration Gt is achieved only by regenerative braking.

In step S180, the regeneration amount Rg corresponding to the vehicle deceleration is determined to match the predetermined regeneration amount rg. Then, "Rg=rg" is transmitted to the driving controller ECD through the communication bus BS. That is, of the target deceleration Gt, the amount corresponding to the predetermined regeneration amount rg is achieved by regenerative braking (the braking force Fg generated by the generator GN), and the remaining amount ("Gt−rg") is achieved by friction braking (the braking force Fp generated by the friction between the rotating member KT and the friction material). In step S190, the front wheel and rear wheel target liquid pressures Ptf and Ptr are determined based on target deceleration Gt and the regeneration amount Rg (=rg). The method of calculating the front wheel target liquid pressure Ptf and the rear wheel target liquid pressure Ptr will be described later. Note that the target liquid pressure Pt (Ptf, Ptr) is a target value of the liquid pressure to be achieved by friction braking.

In step 200, the target rotation number Nt is calculated based on the target liquid pressure Pt (particularly, the front wheel target liquid pressure Ptf). The target rotation number Nt is a target value of the rotation number of the electric motor MC. The target rotation number Nt is calculated so as to monotonically increase as the target liquid pressure Pt increases according to the calculation map Znt. As described above, the adjusted liquid pressure Pc is generated by the orifice effect of the pressure adjusting valve UC. Since a flow rate of certain extent is required to obtain the orifice effect, a predetermined lower limit rotation number no is provided for the target rotation number Nt. The lower limit rotation number no is a minimum required value (a preset constant) in the generation of liquid pressure. The target rotation number Nt may be directly calculated based on the brake operation amount Ba. In any case, the target rotation number Nt is determined based on the brake operation amount Ba.

In step S210, in the first electric motor MC, servo control based on the rotation number (control for causing the actual value to quickly follow the target value) is executed. For example, as the rotation number servo control, the rotation number feedback control of the electric motor MC is executed based on the target rotation number Nt and the actual rotation number Na. In step S210, the rotation angle Ka is time-differentiated based on the motor rotation angle (detection value) Ka, and the motor rotation speed (the actual rotation number per unit time) Na is calculated. Then, the rotation number of the electric motor MC is used as a control variable, and the electrification amount (e.g., supply current) to the electric motor MC is controlled. Specifically, based on the deviation hN (=Nt−Na) between the target value Nt and the actual value Na of the rotation number, the electrification amount to the electric motor MC is finely adjusted so that the rotation number deviation hN becomes "0" (that is, the actual value Na approaches the target value Nt). When "hN>nx", the electrification amount to the electric motor MC is increased, and the speed of the electric motor MC is increased. On the other hand, when "hN<−nx", the electrification amount to the electric motor MC is reduced, and the speed of the electric motor MC is decreased. Here, the predetermined value nx is a preset constant.

In step S220, the servo control based on the liquid pressure is performed in the first pressure adjusting valve UC. For example, as the liquid pressure servo control, liquid pressure feedback control of the pressure adjusting valve UC is executed based on the front wheel target liquid pressure Ptf and the adjusted liquid pressure Pc (detection value of the adjusting liquid pressure sensor PC). In the feedback control, the pressure Pc of the brake liquid BF in the pressure adjusting fluid passage HC is used as a control variable, and the electrification amount to the normally-open linear type first pressure adjusting valve UC is controlled. Based on a deviation hP (=Ptf−Pc) between the front wheel target liquid pressure Ptf and the adjusted liquid pressure Pc, the electrification amount to the pressure adjusting valve UC is adjusted so that the liquid pressure deviation hP approaches "0" (i.e., the adjusted liquid pressure Pc approaches the front wheel target liquid pressure Ptf). When "hP>px", the electrification amount to the pressure adjusting valve UC is increased, and the valve opening amount of the pressure adjusting valve UC is decreased. On the other hand, when "hP<−px", the electrification amount to the first pressure adjusting valve UC is decreased, and the valve opening amount of the pressure adjusting valve UC is increased. Here, the predetermined value px is a preset constant.

In step S230, the second electric motor ML is driven by the controller ECU, and the brake liquid BF is discharged from the upstream side to the downstream side of the rear wheel charge valve UPr by the second fluid pump QLr. When the charge valve UPr is at the open position (fully open state) and the reflux path including the second fluid pump QLr is not narrowed, the upstream liquid pressure (adjusted liquid pressure) Pc and the downstream liquid pressure (output liquid pressure) Pp of the charge valve UP are substantially equal.

A regenerative braking force Fgf acts on the front wheel WHf. The friction braking force Fp is adjusted so that the distribution of the braking force between the front and rear wheels is optimized. In step S240, the servo control based on liquid pressure (liquid pressure servo control) is executed in the rear wheel charge valve (second pressure adjusting valve) UPr. Specifically, the liquid pressure feedback control of the rear wheel charge valve UPr is executed such that the rear wheel output liquid pressure Ppr is increased from the adjusted liquid pressure Pc and adjusted. Specifically, a deviation hQ between the rear wheel target liquid pressure Ptr and the actual rear wheel output liquid pressure Ppr (the detection value of the rear wheel output liquid pressure sensor PPr) is calculated. Then, based on the liquid pressure deviation hQ, the electrification amount to the rear wheel charge valve UPr is adjusted so that the liquid pressure deviation hQ becomes "0" and the rear wheel output liquid pressure Ppr approaches the rear wheel target liquid pressure Ptr.

The rear wheel output liquid pressure sensor PPr may be omitted. In this case, in the control of the rear wheel charge valve UPr, the deceleration slip of the wheel (also simply referred to as "wheel slip") Sw is used as a state variable, and the slip servo control is executed. The servo control based on the wheel slip Sw is based on the fact that when the deceleration slip Sw of the wheel is not excessively large (i.e., when the wheel slip Sw is within a predetermined range), the wheel slip Sw and the wheel braking force F are in a proportional relationship. For example, the vehicle body speed Vw, the wheel speed Vx, and the deviation hV are used as the wheel slip (state quantity) Sw. The wheel slip rate obtained by dividing the deviation hV by the vehicle body speed Vx may be adopted as the wheel slip Sw.

In step S240, the rear wheel target liquid pressure Ptr is converted to the rear wheel target slip Str. Furthermore, the actual rear wheel slip Swr is calculated based on the rear wheel speed Vwr and the vehicle body speed Vx. Then, the electrification amount to the rear wheel charge valve UPr is adjusted such that the actual rear wheel slip Swr (actual value) approaches and matches the rear wheel target slip Str (target value).

<Front-Rear Distribution of Braking Force in Regenerative Cooperative Control>

Figure 3:
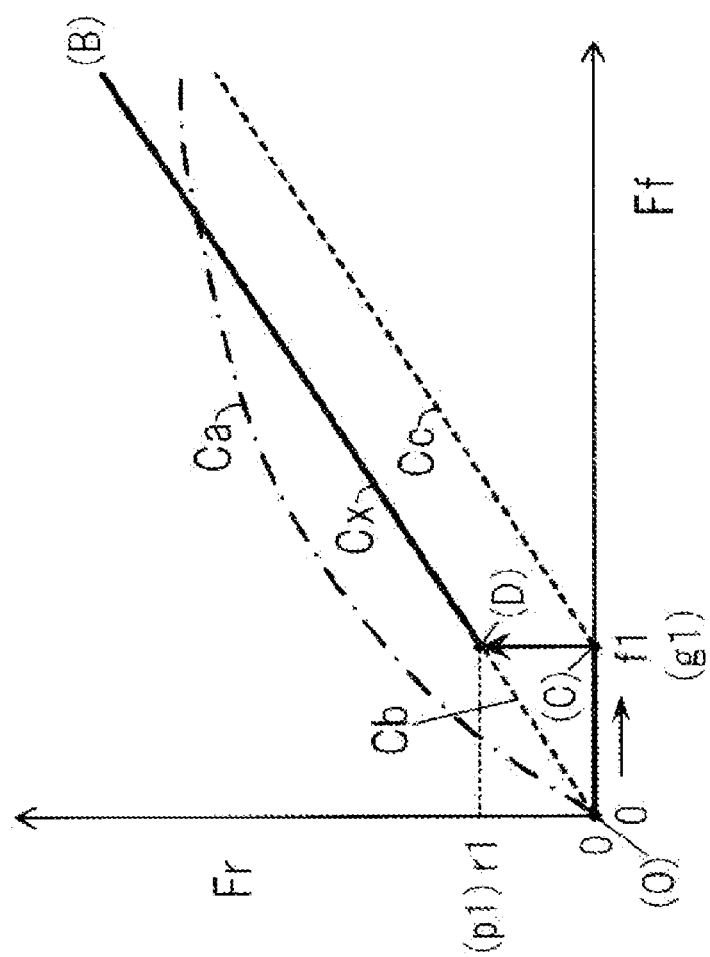
FIG. 3 is a characteristic diagram describing a front-rear distribution of a braking force in a regenerative cooperative control in a vehicle including a generator GN on a front wheel WHf.

With reference to the characteristic diagram of FIG. 3, the front-rear distribution of the braking force F in the regenerative cooperative control will be described in relation to the calculation process shown in FIG. 2. Here, the regenerative generator GN is provided on the front wheel WHf, and the regenerative braking force Fgf acts on the front wheel WHf in addition to the friction braking force Fpf. Therefore, front wheel WHf corresponds to regenerative wheel WHg including the generator GN. On the other hand, since the generator GN is not provided for the rear wheel WHr, regenerative braking force Fgr does not act and only the friction braking force Fpr acts on the rear wheel WHr. That is, the rear wheel WHr corresponds to the non-regenerative wheel WHt including no generator GN.

A characteristic Ca indicated by a chain dashed line represents a so-called ideal braking force distribution in which variation in the ground load (vertical force) of the front and rear wheels involved in the vehicle deceleration is considered. Specifically, in the ideal distribution characteristic Ca, the braking forces Ff and Fr of the front and rear wheels are proportional to the dynamic ground load (vertical force) that takes into consideration the vehicle deceleration. Therefore, in the ideal distribution characteristic Ca, when the anti-skid control is not executed, the front wheel WHf and the rear wheel WHr are simultaneously wheel-locked even on road surfaces having different friction coefficients, and the friction braking force is maximized.

A characteristic Cb (characteristics (O)-(B)) represents a correlation between the front wheel braking force Ff and the rear wheel braking force Fr when the regenerative braking force Fgf does not act (i.e., "Rg=0"). The characteristic Cb is called "reference characteristic". The reference characteristic Cb is based on "the pressure receiving area of the wheel cylinders CWf and CWr of the front wheel and the rear wheel", "the effective braking radius of the rotating members KTf and KTr", and "the friction coefficient of the friction material of the front and rear wheels". In a typical vehicle, the pressure receiving area of the wheel cylinder CW, the effective braking radius of the rotating member KT, and the friction coefficient of the friction material are set such that the characteristic Cb becomes smaller than the ideal distribution characteristic Ca within a range of normal braking (within region excluding region where maximum braking force is generated) so that the rear wheel WHr is not wheel-locked preceding the front wheel WHf. In the region where the maximum braking force is generated, the braking force distribution control (so-called EBD control) is executed based on the wheel speed Vw so that the deceleration slip of the rear wheel WHr does not become greater than the deceleration slip of the front wheel WHf.

When the operation of the brake operation member BP is started, in the initial stage of braking, the adjusted liquid pressure Pc is maintained at "0" based on steps S160 and S170 (i.e., since "Ptf=0, Ptr=0"). Therefore, the brake liquid pressure Pw (=Pp) remains at "0", and the friction braking forces Fpf and Fpr do not act as the front and rear wheel braking forces Ff and Fr. That is, the front wheel braking force Ff is increased from "0" toward the first predetermined force f1 only by the regenerative braking force Fgf, and the rear wheel braking force Fr is maintained at "0". In the diagram, it is represented by a transition from origin (O) (point of "Ff=Fr=0") to point (C).

Furthermore, when the operation amount Ba of the brake operation member BP is increased and the front wheel braking force Ff (=Fgf) reaches the first predetermined force f1 (i.e., the regeneration amount Rg reaches the first predetermined amount g1 (=rg) corresponding to the first predetermined force f1), the determination condition of step S150 is satisfied, and the processes of step S180 and step S190 are executed. First, at the time point (calculation cycle) when step S150 (the condition of "Gt≥rg (=g1)") is satisfied, the rear wheel target liquid pressure Ptr is determined to be "the first predetermined liquid pressure p1 corresponding to the first predetermined force r1" (see the transition from point (C) to point (D)) so that the rear wheel braking force Fr rapidly increases from "0" to the first predetermined force r1. The stepwise sudden increase of the rear wheel brake liquid pressure Pwr (=Ppr) from "0" is achieved by the second pressure adjusting unit YD (particularly, the rear wheel second pressure adjusting valve UPr).

After such time point, the front wheel target liquid pressure Ptf is monotonically increased from "0" according to the increase in the operation amount Ba so that the friction braking force Fp increases along the characteristic Cb. Furthermore, the rear wheel target liquid pressure Ptr is calculated to monotonically increase from "the first predetermined liquid pressure p1 corresponding to the first predetermined force r1" according to the increase in the operation amount Ba. As a result, in "Ff<f1", "Fr=0", and in "Ff≥f1", the characteristic Cx (characteristic (O)-(C)-(D)-(B)) that matches the characteristic Cb is achieved.

In steps S200 and S210, the first electric motor MC is driven by the rotation number servo control, and the reflux of the brake liquid BF including the first fluid pump QC and the first pressure adjusting valve UC is formed. Then, in step S220, the liquid pressure servo control based on the target liquid pressure Pt (particularly, the front wheel target liquid pressure Ptf) is executed, and the pressure adjusting valve UC is controlled so that the adjusted liquid pressure Pc (the detection value of the adjusted liquid pressure sensor PC) matches the front wheel target liquid pressure Ptf. As a result, the braking force Ff (=Fgf+Fpf) acts on the front wheel WHf as a resultant force of a regenerative braking force Fgf corresponding to the first predetermined amount g1 (=rg) and a friction braking force Fpf corresponding to the adjusted liquid pressure Pc. Furthermore, in step S230, the second electric motor ML is rotationally driven, and the reflux of the brake liquid BF including the second rear wheel fluid pump QLr and the rear wheel charge valve (second rear wheel pressure adjusting valve) UPr is formed. In step S240, the liquid pressure servo control based on the rear wheel target liquid pressure Ptr is executed, the adjusted liquid pressure Pc is increased, and the rear wheel charge valve UPr is controlled so that the rear wheel output liquid pressure Ppr (the detection value of the rear wheel output liquid pressure sensor PPr) matches the rear wheel target liquid pressure Ptr. As a result, a friction braking force Fpr (=Fr) corresponding to the rear wheel output liquid pressure Ppr acts on the rear wheel WHr.

When the rear wheel output liquid pressure sensor PPr is omitted, in step S240, the rear wheel target slip Str corresponding to the rear wheel target liquid pressure Ptr is calculated, and a slip servo control based on the rear wheel target slip Str is executed. Specifically, the vehicle body speed Vx is calculated based on the wheel speed Vw (the detection value of the wheel speed sensor VW), and the actual rear wheel slip (actual value) Swr is calculated based on the vehicle body speed Vx and the rear wheel speed Vwr (the detection value of the rear wheel speed sensor VWr). Then, the rear wheel charge valve UPr is controlled such that the rear wheel actual slip Swr approaches the rear wheel target slip Str. The output liquid pressure Ppr is thereby increased from the adjusted liquid pressure Pc, and adjusted.

The characteristic Cc indicates the characteristic when the rear wheel target liquid pressure Ptr is increased not from the first predetermined liquid pressure p1 but from "0" (i.e., when independent control is not performed and "Ptf=Ptr"). The rear wheel braking force Fr in the characteristic Cc is small compared to the rear wheel braking force Fr of the ideal distribution characteristic Ca. Thus, in the characteristic Cc, although the vehicle stability is secured, the rear wheel braking force Fr cannot be fully utilized. On the other hand, in the characteristic Cx achieved by the brake control device SC according to the present invention, the adjusted liquid pressure Pc is adjusted to increase by the rear wheel charge valve UPr, and the liquid pressures (output liquid pressure) Ppf, Ppr of the braking system for the front and rear wheels are independently controlled. The braking forces Ff and Fr of the front and rear wheels are thus suitably secured, and the vehicle stability is maintained and the regenerable energy amount can be sufficiently secured.

Figure 4:
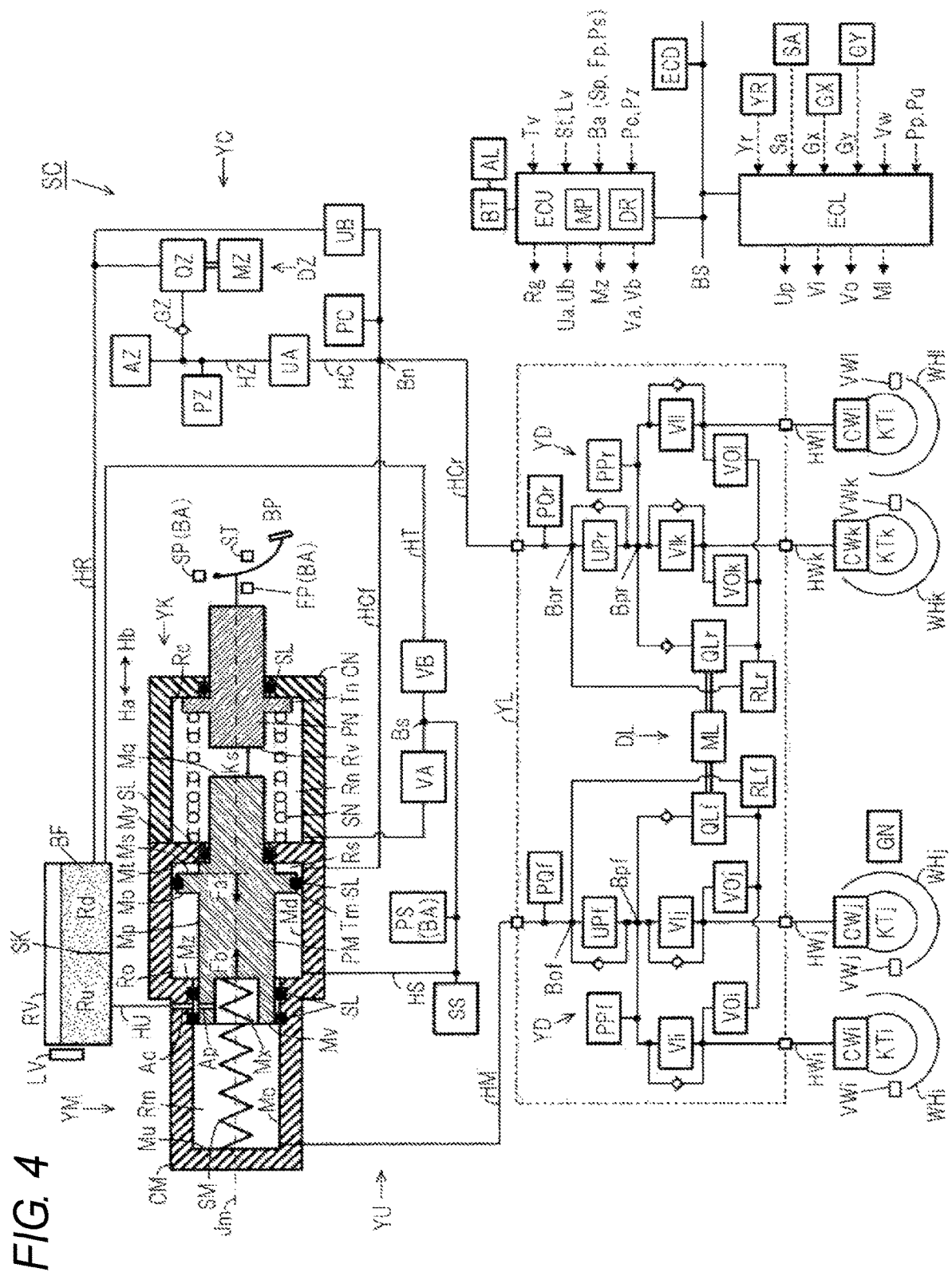
FIG. 4 is an overall configuration view describing a second embodiment of a brake control device SC for a vehicle according to the present invention.

Second Embodiment of Vehicle Brake Control Device According to the Present Invention A second embodiment of the brake control device SC according to the present invention will be described with reference to an overall configuration view of FIG. 4. In the first embodiment described with reference to FIG. 1, a tandem type master cylinder is used as the type of master cylinder CM. In addition, a "reflux type" was adopted for the pressure adjusting method of the first pressure adjusting unit YC, and a "master cylinder downstream pressurization" was adopted for the pressurizing method (pressurizing portion). In the second embodiment, a "single type" is adopted for the master cylinder CM, and an accumulator (referred to as "accumulator type") is used for the first pressure adjusting unit YC. Furthermore, the pressurization by the first pressure adjusting unit YC is performed by introducing the adjusted liquid pressure Pc to the rear surface of the master cylinder CM (a portion on the side opposite to the master cylinder chamber Rin) (referred to as "master cylinder rear surface pressurization)".

In the second embodiment, a fluid unit for realizing vehicle stabilization control is adopted as the second pressure adjusting unit YD. In the second embodiment, a lower fluid unit YL including the second pressure adjusting unit YD is provided separately from the upper fluid unit YU including a first pressure adjusting unit YC. The upper fluid unit YU is controlled by the upper controller ECU, and the lower fluid unit YL is controlled by the lower controller ECL different from the upper controller ECU. The two controllers ECU and ECL are connected in a communicable state by a communication bus BS. Hereinafter, the differences will be mainly described.

As described above, configuring members, calculation processes, signals, characteristics, and values denoted by the same symbols are of the same function. The suffixes "i" to "l" at the end of the symbols are comprehensive symbols indicating which wheel is related, where "i" is the right front wheel, "j" is the left front wheel, "k" is the right rear wheel, and "l" is the left rear wheel. When the subscripts "i" to "l" are omitted, each symbol represents a generic name of each of the four wheels. The suffixes and "r" at the end of the symbols are comprehensive symbols indicating which system of the front and rear wheels is related in the fluid passages of two systems (the movement path of the brake liquid BF), where "f" Indicates a front wheel system, and "r" indicates a rear wheel system. If the suffixes "f" and "r" are omitted, they represent the generic name of the two systems. In each fluid passage, "upstream side (or upper part)" is a side closer to the reservoir RV, and "downstream side (or lower part)" is a side closer to the wheel cylinder CW.

The vehicle includes a steering angle sensor SA for detecting the steering angle Sa of the steering wheel. A yaw rate sensor YR is provided to detect the yaw rate (yaw angular speed) Yr of the vehicle. A longitudinal acceleration sensor GX and a lateral acceleration sensor GY are provided to detect acceleration in the longitudinal direction (longitudinal acceleration) Gx and acceleration in the lateral direction (lateral acceleration) Gy of the vehicle. The detected steering angle Sa, yaw rate Yr, longitudinal acceleration Gx, and lateral acceleration Gy are input to the lower controller ECL. Furthermore, the wheel speed Vw detected by the wheel speed sensor VW is input to the lower controller ECL. In the controller ECL, the vehicle body speed Vx is calculated based on the wheel speed Vw. These signals (Vw etc.) are adopted for the braking control independent of each wheel such as anti-skid control, vehicle stabilization control, and the like.

<<Brake Control Device SC>>

The brake control device SC includes an upper fluid unit YU on the side closer to the master cylinder CM and a lower fluid unit YL on the side closer to the wheel cylinder CW. The upper fluid unit YU is a fluid unit controlled by the upper controller ECU and included in the brake control device SC.

The upper fluid unit YU includes a master unit YM, a first pressure adjusting unit YC, a regenerative cooperation unit YK, and an upper controller ECU, in addition to the operation amount sensor BA and the operation switch ST.

The operation amount Ba of the brake operation member (brake pedal) BP by the driver is detected by the operation amount sensor BA. As the operation amount sensor BA, an operation displacement sensor SP for detecting the operation displacement Sp and an operation force sensor FP for detecting the operation force Fp are provided. Furthermore, a simulator liquid pressure sensor PS is provided as the operation amount sensor BA so as to detect a liquid pressure (simulator liquid pressure) Ps in the stroke simulator SS. In the second embodiment, the master cylinder liquid pressure sensor PM is not used.

[Master Unit YM]

The liquid pressure (front wheel brake liquid pressure) Pwf in the wheel cylinder CWf of the front wheel is adjusted by the master unit YM through the master cylinder chamber Rm. The master unit YM includes a master cylinder CM, a master piston PM, and a master elastic body SM.

The master cylinder CM is a cylinder member having a bottom portion. The master piston PM is a piston member inserted inside the master cylinder CM, and is movable in conjunction with the operation of the brake operation member BP. The inside of the master cylinder CM is partitioned into three chambers (liquid pressure chambers) Rm, Rs, and Ro by the master piston PM.

A groove portion is formed in a first inner peripheral portion Mc of the master cylinder CM, and two seals SL are fitted into the groove portion. An outer peripheral portion (outer peripheral cylindrical surface) Mp of the master piston PM and the first inner peripheral portion (inner peripheral cylindrical surface) Mc of the master cylinder CM are sealed by the two seals SL. The master piston PM is smoothly movable along the center axis Jm of the master cylinder CM.

The master cylinder chamber (simply referred to as the "master chamber") Rm is a liquid pressure chamber defined by the "first inner peripheral portion Mc and the first bottom portion (bottom surface) Mu of the master cylinder CM", and the first end Mv of the master piston PM. A master cylinder fluid passage HM is connected to the master chamber Rm, and it is ultimately connected to the wheel cylinder CWf of the front wheel through the lower fluid unit YL.

The master piston PM is provided with a flange portion (flange) Tm. The inside of the master cylinder CM is partitioned by the flange portion Tm into a servo liquid pressure chamber (simply referred to as "servo chamber") Rs and a rear liquid pressure chamber (simply referred to as "rear chamber") Ro. A seal SL is provided on the outer peripheral portion of the flange portion Tm, and the flange portion Tm and the second inner peripheral portion Md of the master cylinder CM are sealed (sealed). The servo chamber Rs is a liquid pressure chamber defined by "the second inner peripheral portion Md and the second bottom portion (bottom surface) Mt of the master cylinder CM" and the first surface Ms of the flange portion Tm of the master piston PM. The master chamber Rm and the servo chamber Rs are arranged to face each other with the master piston PM (particularly, flange portion Tm) interposed therebetween. A front wheel pressure adjusting fluid passage HCf is connected to the servo chamber Rs, and an adjusted liquid pressure Pc is introduced from the first pressure adjusting unit YC. That is, a "master cylinder rear surface pressurizing type" is employed in the pressurization portion.

The rear chamber (rear liquid pressure chamber) Ro is a liquid pressure chamber defined by a second inner peripheral portion Md of the master cylinder CM, a stepped portion Mz, and a second surface Mo of the flange portion Tm of the master piston PM. The rear liquid pressure chamber Ro is located between the master liquid pressure chamber Rm and the servo liquid pressure chamber Rs in the direction of the center axis Jm. A simulator fluid passage HS is connected to the rear chamber Ro. The amount of brake liquid BF in the upper fluid unit YU is adjusted by the rear chamber Ro.

The first end Mv of the master piston PM is provided with a depression Mx. A master elastic body (e.g., compression spring) SM is provided between the depression Mx and a first bottom portion Mu of the master cylinder CM. The master elastic body SM presses the master piston PM against a second bottom portion Mt of the master cylinder CM in the direction of the center axis Jm of the master cylinder CM. At the time of non-braking, a stepped portion My of the master piston PM is in abutted against the second bottom portion Mt of the master cylinder CM. The position of the master piston PM in this state is referred to as "the initial position of the master unit YM".

A through hole Ac is provided in the master cylinder CM between two seals SL (e.g., cup seal). The through hole Ac is connected to the master reservoir chamber Ru through a supply fluid passage HU. Furthermore, a through hole Ap is provided near the first end Mv of the master piston PM. When the master piston PM is at the initial position, the master chamber Rm is in a communicating state with the reservoir RV (particularly, the master reservoir chamber Ru) through the through holes Ac and Ap and the supply fluid passage HU.

The master chamber Rm applies to the master piston PM a biasing force Fb (referred to as "retreating force") in the retreating direction Hb along the center axis Jm by its internal pressure ("master cylinder liquid pressure", also referred to as "master liquid pressure") Pm. The servo chamber (servo liquid pressure chamber) Rs applies to the master piston PM a biasing force Fa (referred to as an "advancing force") opposing the retreating force Fb by its internal pressure (i.e., the introduced adjusted liquid pressure Pc). That is, in the master piston PM, the advancing force Fa by the liquid pressure Pv (=Pc) in the servo chamber Rs and the retreating force Fb by the liquid pressure (master liquid pressure) Pm in the master chamber Rm oppose each other (confront each other) in the direction of the center axis Jm, and are statically balanced.

For example, the pressure receiving area of the first surface Ms of the flange portion Tm (i.e., the pressure receiving area of the servo chamber Rs) rs is set to be equal to the pressure receiving area of the first end My of the master piston PM (i.e., the pressure receiving area of the master chamber Rm) rm. In this case, the liquid pressure Pc introduced into the servo chamber Rs (as a result, the servo liquid pressure Pv) and the liquid pressure Pm in the master chamber Rm are the same in a steady state. At this time, the advancing force Fa (=Pc×rs) and the retreating force Fb (=Pm×rm (+SM elastic force)) are balanced.

When the brake operation member BP is operated, the adjusted liquid pressure Pc is increased by the first pressure adjusting unit YC. The adjusted liquid pressure Pc is supplied into the servo chamber Rs, and the liquid pressure (servo liquid pressure) Pv in the servo chamber Rs is increased. When the force Fa in the advancing direction (leftward direction in the figure) Ha generated by the servo liquid pressure Pv becomes larger than the set load of the master elastic body SM, the master piston PM is moved along the center axis Jm. When the through hole Ap passes through the seal SL due to the movement in the advancing direction Ha, the master chamber Rm is shut off from the reservoir RV (in particular, the master reservoir chamber Ru). Furthermore, when the adjusted liquid pressure Pc increases, the volume of the master chamber Rm decreases, and the brake liquid BF is sent from the master cylinder CM toward the wheel cylinder CWf of the front wheel at the master liquid pressure Pm. A force (retreating force) Fb in the retreating direction Hb acts on the master piston PM by a master liquid pressure Pm (=Pwf). The servo chamber Rs generates a force (advancing force) Fa in the advancing direction Ha by the servo liquid pressure Pv (=Pc) so as to oppose (oppose) the retreating force Fb. The master liquid pressure Pm is thus increased or decreased according to the increase or decrease of the adjusted liquid pressure Pc.

When the brake operation member BP is returned, the adjusted liquid pressure Pc is reduced by the first pressure adjusting unit YC. Then, the servo liquid pressure Pv becomes smaller than the master chamber liquid pressure Pm (=Pwf), and the master piston PM is moved in the retreating direction (rightward in the drawing) Hb. When the brake operation member BP is in the non-operated state, the elastic force of the compression spring SM causes the master piston PM (particularly, the stepped portion My) to return to the position (initial position) where it come into contact with the second bottom portion Mt of the master cylinder CM.

[First Pressure Adjusting Unit YC (Accumulator Type)]

The liquid pressure Pm in the master chamber Rm and the liquid pressure (rear wheel brake liquid pressure) Pwr in the wheel cylinder CWr of the rear wheel are adjusted by the first pressure adjusting unit YC. The first pressure adjusting unit YC includes an electric pump DZ, an accumulator AZ, an accumulator liquid pressure sensor (also referred to as a "pressure accumulation sensor") PZ, an increasing pressure adjusting valve UA, a decreasing pressure adjusting valve UB, and an adjusted liquid pressure sensor PC. The first pressure adjusting unit YC is an "accumulator type" in which an accumulator is used.

The first pressure adjusting unit YC is provided with a pressure accumulating electric pump DZ such that the pressurized brake liquid BF is accumulated in the accumulator AZ. The pressure accumulating electric pump DZ is configured by a set of one pressure accumulating electric motor MZ and one pressure accumulating fluid pump QZ. In the pressure accumulating electric pump DC, the electric motor MZ and the fluid pump QZ are fixed so that the electric motor MZ and the fluid pump QZ rotate integrally. The pressure accumulating electric pump DZ (particularly, the pressure accumulating electric motor MZ) is a power source for maintaining the liquid pressure (accumulator liquid pressure) Pz in the accumulator AZ at a high pressure. The pressure accumulating electric motor MZ is rotationally driven by the controller ECU. For example, a brush motor is employed as the electric motor MZ.

The brake liquid BF discharged from the pressure accumulating fluid pump QZ is accumulated in the accumulator AZ. An accumulator fluid passage HZ is connected to the accumulator AZ, and the accumulator AZ and the increasing pressure adjusting valve UA are connected. A pressure accumulation sensor PZ is provided in the accumulator fluid passage HZ so as to detect the liquid pressure (accumulator liquid pressure) Pz accumulated in the accumulator AZ. A check valve GZ is provided at the discharge portion of the pressure accumulating fluid pump QZ so that the brake liquid BF does not flow backward from the accumulator AZ.

The pressure accumulating electric pump DZ (particularly, the pressure accumulating electric motor MZ) is controlled by the controller ECU so that the accumulator liquid pressure Pz is maintained within a predetermined range. Specifically, when the accumulator liquid pressure Pz is lower than a lower limit value (predetermined value) pl, the electric motor MZ is driven at a predetermined rotation number. Furthermore, when the accumulator liquid pressure Pz is greater than or equal to an upper limit value (predetermined value) pu, the electric motor MZ is stopped. Here, the lower limit value pl and the upper limit value pu are predetermined constants set in advance, and have a relationship of "pl<pu". Therefore, the liquid pressure Pz in the accumulator AZ is maintained in the range from the lower limit value pl to the upper limit value pu.

The first pressure adjusting unit YC is provided with a normally-closed increasing pressure adjusting valve UA and a normally-open decreasing pressure adjusting valve UB. The increasing pressure adjusting valve UA and the decreasing pressure adjusting valve UB are connected by the pressure adjusting fluid passage HC. Furthermore, the decreasing pressure adjusting valve UB is connected to the reservoir fluid passage HR. The increasing/decreasing pressure adjusting valves UA and UB are linear type electromagnetic valves (proportional valves) whose valve opening amount is continuously controlled based on the electrification amount (e.g., supply current). The pressure adjusting valves UA, UB are controlled by the controller ECU based on the drive signals Ua, Ub.

When the adjusted liquid pressure (first liquid pressure) Pc is adjusted, the increasing pressure adjusting valve UA is energized, and the brake liquid BF flows from the accumulator AZ into the pressure adjusting fluid passage HC through the accumulator fluid passage HZ. Furthermore, based on the adjusted liquid pressure Pc (actual value), the energization of the decreasing pressure adjusting valve UB is performed, and the adjusted liquid pressure Pc is adjusted. Similarly to the first embodiment, an adjusted liquid pressure sensor PC is provided to detect the adjusted liquid pressure Pc.

The pressure adjusting fluid passage HC is branched (divided) into a front wheel pressure adjusting fluid passage HCf and a rear wheel pressure adjusting fluid passage HCr at a branch portion Bn. The front wheel pressure adjusting fluid passage HCf is connected to the servo chamber Rs, and the adjusted liquid pressure Pc is applied to the servo chamber Rs. Furthermore, the rear wheel pressure adjusting fluid passage HCr is connected to the lower fluid unit YL, and is ultimately connected to the wheel cylinders CWr (CWk, CWl) of the rear wheels. Therefore, the adjusted liquid pressure Pc is applied to the wheel cylinder CWr of the rear wheel. The liquid pressure Pwr of the wheel cylinder CWr of the rear wheel is directly controlled by the first pressure adjusting unit YC without passing through the master cylinder CM. That is, a single type is used as the master cylinder CM. Thus, the dimension of the master cylinder CM in the direction of the center axis Jm can be reduced.

[Regenerative cooperation unit YK]

Cooperative control of friction braking and regenerative braking is achieved by the regenerative cooperation unit YK. That is, a state can be formed in which the brake operation member BP is operated by the regenerative cooperation unit YK, but the brake liquid pressure Pw is not generated. The regenerative cooperation unit YK includes an input cylinder CN, an input piston PN, an input elastic body SN, a first switching valve VA, a second switching valve VB, a stroke simulator SS, and a simulator liquid pressure sensor PS.

The input cylinder CN is a cylinder member having a bottom portion fixed to the master cylinder CM. The input piston PN is a piston member inserted inside the input cylinder CN. The input piston PN is mechanically connected to the brake operation member BP through a clevis (U-shaped link) so as to cooperatively operate with the brake operation member BP. The input piston PN is provided with a flange portion (flange) Tn. An input elastic body (e.g., compression spring) SN is provided between the mounting surface of the input cylinder CN to the master cylinder CM and the flange portion Tn of the input piston PN. The input elastic body SN presses the flange portion Tn of the input piston PN against the bottom portion of the input cylinder CN in the direction of the center axis Jm.

At the time of non-braking, the stepped portion My of the master piston PM is abutted against the second bottom portion Mt of the master cylinder CM, and the flange portion Tn of the input piston PN is abutted against the bottom portion of the input cylinder CN. At the time of non-braking, a gap Ks between the master piston PM (particularly, the end face Mq) and the input piston PN (particularly, the end face Rv) is set to a predetermined distance ks (referred to as an "initial gap") inside the input cylinder CN. That is, when the pistons PM and PN are at the positions in the most retreating direction Hb (referred to as "initial positions" of the respective pistons) (i.e., at the time of non-braking), the master piston PM and the input piston PN are separated by a predetermined distance ks. Here, the predetermined distance ks corresponds to the maximum value of the regeneration amount Rg. When the regenerative cooperative control is executed, the gap (also referred to as "separation displacement") Ks is controlled (adjusted) by the adjusted liquid pressure Pc.

The diameter dm of the master piston PM (end Mq) in the input cylinder CN is set to be equal to the diameter dn of the input piston PN that enters the input cylinder CN when the brake operation member BP is operated. In other words, the cross-sectional area am based on the diameter dm and the cross-sectional area an based on the diameter dn match. As will be described later, the manual braking is realized by fluid-locking the inside of the input cylinder CN. When manual braking is performed, since "dm=dn (am=an)", the intrusion volume of the input piston PN into the input cylinder CN matches the retreat volume of the master piston PM out of the input cylinder CN, and each piston PN, PM is moved in the advancing direction Ha. That is, the displacement Hn of the input piston PN matches the displacement Hm of the master piston PM, and the force Fn applied to the input piston PN by the driver is used as it is as the force Fm acting on the master piston PM (i.e., "Hn=Hm, Fn=Fm").

The input cylinder CN is connected to the reservoir RV (particularly, the pressure adjusting reservoir chamber Rd) through the second reservoir fluid passage HT. A part of the second reservoir fluid passage HT can be shared with the first reservoir fluid passage HR. However, it is desirable that the first reservoir fluid passage HR and the second reservoir fluid passage HT are desirably separately connected to the reservoir RV. The fluid pump QC suctions the brake liquid BF from the reservoir RV through the first reservoir fluid passage HR, but at this time, bubbles may be mixed in the first reservoir fluid passage HR. Thus, the second reservoir fluid passage HT does not have a common portion with the first reservoir fluid passage HR and is connected to the reservoir RV separate from the first reservoir fluid passage HR so as to avoid air bubbles from mixing the input cylinder CN and the like.

In the second reservoir fluid passage HT, two switching valves VA and VB are provided in series. The first and second switching valves VA and VB are two-position electromagnetic valves (also referred to as "on/off valves") having an open position (communicated state) and a closed position (shut-off state). The first and second switching valves VA and VB are controlled by the upper controller ECU based on the drive signals Va, Vb. A normally-closed electromagnetic valve is employed as the first switching valve VA, and a normally-open electromagnetic valve is employed as the second switching valve VB.

The second reservoir fluid passage HT is connected to the simulator fluid passage HS at a connecting portion Bs between the first switching valve VA and the second switching valve VB. In other words, one end of the simulator fluid passage HS is connected to the rear chamber Ro, and the other end is connected to the portion Bs. The simulator fluid passage HS is provided with a stroke simulator (also simply referred to as "simulator") SS. When the regenerative cooperative control is executed by the simulator SS, and the first switching valve VA is at the open position and the second switching valve VB is at the closed position, the operation force Fp of the brake operation member BP is generated. A piston and an elastic body (e.g., compression spring) are provided inside the simulator SS. The brake liquid BF is moved from the input cylinder CN to the simulator SS, and the piston is pushed by the brake liquid BF flowing in. A force is exerted on the piston in a direction of inhibiting the inflow of the brake liquid BF by the elastic body. The elastic body forms an operation force Fp when the brake operation member BP is operated.

A simulator liquid pressure sensor PS is provided in the simulator fluid passage HS so as to detect a liquid pressure (simulator liquid pressure) Ps in the simulator SS. The simulator liquid pressure sensor PS is one of the above-described brake operation amount sensors BA. The detected simulator liquid pressure Ps is input to the controller ECU as a brake operation amount Ba.

The cross-sectional area am of the end Mq of the master piston PM is set to be equal to the area ao of the second surface Mo of the flange portion Tm so that a volume change accompanying the movement of the master piston PM is absorbed. When the regenerative cooperative control is executed, the first switching valve VA is at the open position and the second switching valve VB is at the closed position, and hence the input chamber Rn and the rear chamber Ro are connected by the second reservoir fluid passage HT and the simulator fluid passage HS. When the master piston PM is moved in the advancing direction Ha, the volume in the input chamber Rn is increased by the movement amount, but since "am=ao", the brake liquid BF corresponding to the increase in volume are all moved from the rear chamber Ro to the input chamber Rn. In other words, there is no excess or deficiency in the balance of the liquid amount accompanying the movement of the master piston PM. Therefore, the amount (volume) of brake liquid BF flowing into the simulator SS or out of the simulator SS depends only on the movement of the input piston PN.

[Upper controller ECU]

The electric motor MZ and the electromagnetic valves VA, VB, UA, UB are controlled by the upper controller ECU based on the brake operation amount Ba, the operation signal St, the adjusted liquid pressure Pc and the output liquid pressure Pp. The drive signals Va, Vb, Ua, Ub for controlling various electromagnetic valves VA, VB, UA, UB are calculated. Similarly, the drive signal Mz for controlling the electric motor MZ is calculated. The electromagnetic valves VA, VB, UA, UB and the electric motor MZ are driven based on these drive signals Va, Vb, Ua, Ub, Mz.

The upper controller ECU is network connected to the lower controller ECL and the controller (electronic control unit) of another system through an in-vehicle communication bus BS. The regeneration amount Rg (target value) is transmitted from the upper controller ECU to the driving controller ECD through the communication bus BS so as to execute regenerative cooperative control.

At the time of non-braking (e g, when the operation of the brake operation member BP is not performed), the electromagnetic valves VA, VB, UA, and UB are not energized. Therefore, the first switching valve VA is at the closed position, and the second switching valve VB is at the open position.

At the time of control braking when the brake control device SC is in a state of performing appropriate operation, first, the controller ECU energizes the first and second switching valves VA and VB, and the first switching valve VA is at the open position and the second switching valve VB is at the closed position. The input chamber Rn and the rear chamber Ro are fluidly connected, and the simulator SS is connected to the input chamber Rn depending on the open position of the first switching valve VA. Furthermore, the connection between the simulator SS and the reservoir RV is shut off by the closed position of the second switching valve VB. The input piston PN is moved in the advancing direction Ha by the operation of the brake operation member BP, the movement causing the liquid amount flowing out from the input chamber Rn to flow into the simulator SS, thus forming the operation force Fp of the brake operation member BP.

At the time of control braking, the controller ECU controls the first pressure adjusting unit YC based on the operation amount Ba. The adjusted liquid pressure Pc that has been adjusted by the first pressure adjusting unit YC is introduced to the servo chamber Rs through the front wheel pressure adjusting fluid passage HCf. The master piston PM is moved in the advancing direction Ha by the adjusted liquid pressure Pc, and the brake liquid BF is sent from the master chamber Rm toward the wheel cylinders CWf (CWi, CWj) of the front wheels. When the pressure receiving area rs of the servo chamber Rs is equal to the pressure receiving area rm of the master chamber Rm, the master liquid pressure Pm equal to the adjusted liquid pressure Pc is applied to the wheel cylinder CWf of the front wheel. Furthermore, the adjusted liquid pressure Pc is introduced into the wheel cylinders CWr (CWk, CWl) of the rear wheels through the rear wheel pressure adjusting fluid passage HCr.

At the time of manual braking, the first and second switching valves VA and VB are not energized. Therefore, the first switching valve VA is at the closed position, and the second switching valve VB is at the open position. The input chamber Rn is in a fluid locked state (sealed state) by the closed position of the first switching valve VA, so that the input piston PN and the master piston PM cannot be relatively moved. Moreover, the rear chamber Ro is fluidly connected to the reservoir RV through the second reservoir fluid passage HT by the open position of the second switching valve VB. Therefore, the volume of the rear chamber Ro is reduced by the movement of the master piston PM in the advancing direction Ha, but the liquid amount accompanying the volume reduction is discharged toward the reservoir RV. In conjunction with the operation of the brake operation member BP, the input piston PN and the master piston PM are integrally moved and the brake liquid BF is sent from the master chamber Rm.

[Lower Fluid Unit YL]

The lower fluid unit YL is controlled by a lower controller ECL. The wheel speed Vw, the yaw rate Yr, the steering angle Sa, the longitudinal acceleration Gx, the lateral acceleration Gy, and the like are input to the lower controller ECL.

For example, in the lower fluid unit YL, anti-skid control is executed based on the wheel speed Vw so as to suppress excessive deceleration slip of the wheel WH (e.g., wheel lock). In the anti-skid control, first, the vehicle body speed Vx is calculated based on the wheel speed Vw. A deceleration slip (e.g., a difference between the wheel speed Vx and the vehicle body speed Vw) Sw of each wheel WH is calculated based on the wheel speed Vw and the vehicle body speed Vx. When the wheel slip Sw exceeds the threshold value sx and becomes excessive large, the brake liquid pressure Pw is reduced by the electromagnetic valves VI and VO to be described later. When the wheel slip Sw becomes less than the threshold value sy and the grip of the wheel WH is restored, the brake liquid pressure Pw is increased by the electromagnetic valves VI and VO.

Furthermore, in the lower fluid unit YL, vehicle stabilization control (so-called ESC) for suppressing unstable behavior of the vehicle (excessive oversteer behavior and understeer behavior) is performed based on the actual yaw rate Yr. In the vehicle stabilization control, first, a target yaw rate Yt is calculated based on the vehicle body speed Vx and the steering angle Sa. A deviation hY between the target yaw rate Yt and the actual yaw rate Yr (detection value) is calculated. Then, an excessive oversteer behavior and an excessive understeer behavior are determined based on the yaw rate deviation hY. Based on the determination result, the brake liquid pressure Pw of each wheel is independently controlled, the vehicle is decelerated, and a yaw moment for stabilizing the vehicle is formed. As described above, in the lower fluid unit YL, braking control independent of each wheel is executed based on the signal (Vw etc.).

In addition, the lower fluid unit YL includes a second pressure adjusting unit YD. In the regenerative cooperative control, the adjusted liquid pressure Pc is further adjusted by the second pressure adjusting unit YD so that the front wheel system and the rear wheel system are independently controlled. The upper controller ECU and the lower controller ECL are communicably connected by a communication bus BS, and share a sensor signal and a calculated value. The upper fluid unit YU and the lower fluid unit YL are connected through a master cylinder fluid passage HM and a rear wheel pressure adjusting fluid passage HCr.

The lower fluid unit YL is configured by a second electric pump DL, "front wheel and rear wheel low-pressure reservoirs RLf and RLr", "front wheel and rear wheel charge valves UPf and UPr (correspond to "second pressure adjusting valve")", "front wheel and rear wheel input liquid pressure sensors PQf and PQr", "front wheel and rear wheel output liquid pressure sensors PPf, PPr", "inlet valve VI", and "outlet valve VO". Here, the second electric pump DL, the charge valves (second pressure adjusting valves) UPf, UPr, and the output liquid pressure sensors PPf, PPr are components of the second pressure adjusting unit YD.

The second electric pump DL includes one second electric motor ML and two second fluid pumps QLf and QLr. The second electric motor ML is controlled by the lower controller ECL based on the drive signal Ml. The two second fluid pumps QLf and QLr for the front wheel and the rear wheel are integrally rotated and driven by the electric motor ML. The front wheel and rear wheel second fluid pumps QLf and QLr of the second electric pump DL pump the brake liquid BF from the upstream portions Bof, Bor of the front wheel and rear wheel charge valves (second pressure adjusting valve, and also referred to as "charge over valves") UPf, UPr, and discharge the brake liquid BF to the downstream portions Bpf, Bpr of the charge valves UPf, UPr. The front wheel and rear wheel low-pressure reservoirs RLf and RLr are provided on the suction side of the front wheel and rear wheel fluid pumps QLf and QLr.

Similarly to the first linear pressure adjusting valve UC, a normally-open linear pressure adjusting valve (an electromagnetic valve in which the valve opening amount is continuously controlled according to the energized state) is employed as the charge valve UP (generic name for UPf and UPr). The second linear pressure adjusting valve UP is controlled by the lower controller ECL based on the drive signal Up (Upf, Upr).

When the front wheel second fluid pump QLf is driven, a reflux (flow of the circulating brake liquid BF) of "Bof→RLf→QLf→Bpf→UPf→Bof" is formed. The liquid pressure (front wheel output liquid pressure, front wheel second liquid pressure) Ppf of the downstream portion of the front wheel charge valve UPf is adjusted by the front wheel charge valve UPf provided in the master cylinder fluid passage HM. The brake liquid BF is moved from the upstream portion Bof to the downstream portion Bpf of the front wheel charge valve UPf by the fluid pump QLf, and the differential pressure (Ppf>Pqf) between the input liquid pressure Pqf of the upstream portion and the output liquid pressure Ppf of the downstream portion is adjusted by the front wheel charge valve UPf (narrowing of the valve opening portion).

Similarly, a reflux of "Bor→RLr→QLr→Bpr→UPr→Bor" is formed by the drive of the rear wheel second fluid pump QLr. The liquid pressure (rear wheel output liquid pressure, rear wheel second liquid pressure) Ppr of the downstream portion of the rear wheel charge valve UPr is adjusted by the rear wheel charge valve UPr provided in the rear wheel pressure adjusting fluid passage HCr. That is, the brake liquid BF is moved from the upper portion Bor to the lower portion Bpr of the rear wheel charge valve UPr by the fluid pump QLr, and the differential pressure (Ppr>Pqr) between the upper liquid pressure (input liquid pressure) Pqr and the lower liquid pressure (output liquid pressure) Ppr is adjusted by the rear wheel charge valve UPr.

Front and rear wheel input liquid pressure sensors PQf and PQr are provided to detect input liquid pressures Pqf and Pqr of the front and rear wheels. Furthermore, front and rear wheel output liquid pressure sensors PPf and PPr are provided to detect output liquid pressures (second liquid pressures) Ppf and Ppr of the front and rear wheels. The detected liquid pressure signals Pq and Pp are input to the lower controller ECL. Note that at least one of the four liquid pressure sensors PQf, PQr, PPf, and PPr can be omitted.

The master cylinder fluid passage HM is branched (divided) into each wheel cylinder fluid passages HWi and HWj of the front wheel at a front wheel branch portion Bpf on the downstream side of the front wheel charge valve UPf. Similarly, the rear wheel pressure adjusting fluid passage HCr is branched into each wheel cylinder fluid passages HWk and HW1 of the rear wheel at a rear wheel branch portion Bpr on the downstream side of the rear wheel charge valve UPr.

An inlet valve VI and an outlet valve VO are provided in the wheel cylinder fluid passage HW. A normally-open on/off electromagnetic valve is employed as the inlet valve VI. Furthermore, a normally-closed on/off electromagnetic valve is employed as the outlet valve VO. The electromagnetic valves VI and VO are controlled by the lower controller ECL based on the drive signals Vi and Vo. The brake liquid pressure Pw of each wheel can be independently controlled by the inlet valve VI and the outlet valve VO. When the inlet valve VI and the outlet valve VO are not driven, the front wheel brake liquid pressure Pwf (Pwi, Pwj) is the same as the front wheel output liquid pressure Ppf, and the rear wheel brake liquid pressure Pwr (Pwk, Pwl) is the same as the rear wheel output liquid pressure Ppr.

In the inlet valve VI and the outlet valve VO, since the configuration relating to each wheel WH is the same, the configuration relating to the right front wheel WHi will be described as an example. A normally-open type inlet valve VIi is interposed in the wheel cylinder fluid passage HWi for the right front wheel (fluid passage connecting the branch portion Bpf and the wheel cylinder CWi of the right front wheel). The wheel cylinder fluid passage HWi is fluidly connected to the low-pressure reservoir RLf at a downstream portion of the inlet valve VIi through a normally-closed outlet valve VOi. For example, in the anti-skid control, in order to reduce the liquid pressure Pwi in the wheel cylinder CWi, the inlet valve VIi is at the closed position and the outlet valve VOi is at the open position. The inflow of the brake liquid BF from the inlet valve VIi is prevented, the brake liquid BF in the wheel cylinder CWi flows out to the low-pressure reservoir RLf, and the brake liquid pressure Pwi is reduced. Furthermore, in order to increase the brake liquid pressure Pwi, the inlet valve Vli is at the open position and the outlet valve VOi is at the closed position. The outflow of the brake liquid BF to the low-pressure reservoir RLf is prevented, the output liquid pressure Ppf through the front wheel charge valve UPf is introduced into the wheel cylinder CWi, and the right front wheel brake liquid pressure Pwi is increased.

As described above, the pressure receiving area rs of the servo chamber Rs and the pressure receiving area rm of the master chamber Rm are set to be the same, and "Pc=Pm", and thus the supply of the adjusted liquid pressure Pc to the servo chamber Rs is equivalent to the supply of the adjusted liquid pressure Pc to the wheel cylinder CW. On the other hand, when the pressure receiving area rs of the servo chamber Rs is different from the pressure receiving area rm of the master chamber Rm, the adjusted liquid pressure Pc is increased or decreased by the area ratio. However, from the viewpoint of power transmission, the application of the adjusted liquid pressure Pc to the servo chamber Rs corresponds to the application of the adjusted liquid pressure Pc to the wheel cylinder CW.

<To Explain Another Configuration Example of First Pressure Adjusting Unit YC>

Figure 5:
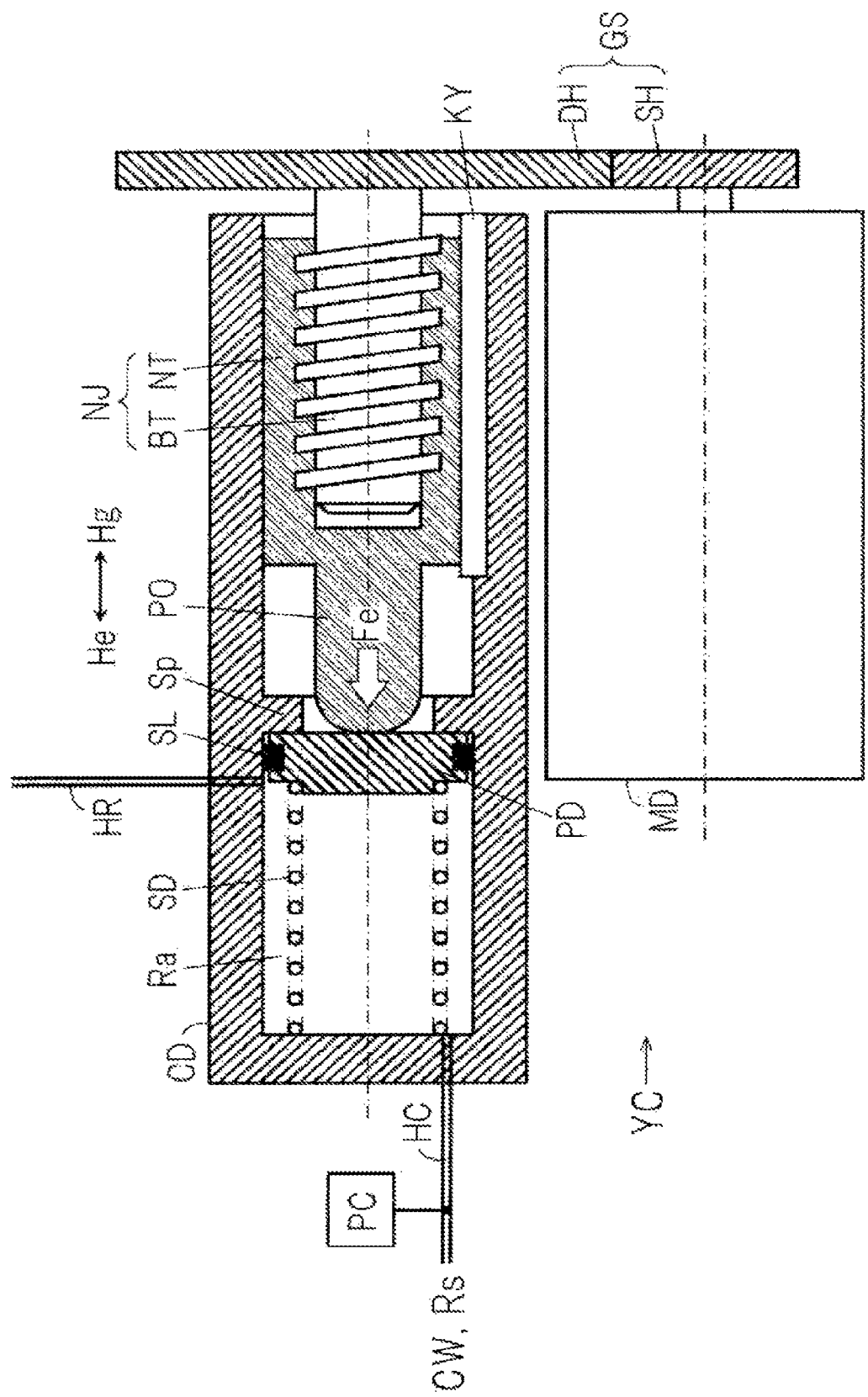
FIG. 5 is a schematic view describing another configuration example of a first pressure adjusting unit YC.

Another configuration example of the first pressure adjusting unit YC will be described with reference to the schematic view of FIG. 5. The reflux type first pressure adjusting unit YC has been described with reference to FIG. 1, and the accumulator type first pressure adjusting unit YC has been described with reference to FIG. 4. In place of these, in another configuration example, the pressure adjusting piston PD provided in the pressure adjusting cylinder CD is pressed by the pressure adjusting electric motor MD, whereby the adjustment of the adjusted liquid pressure Pc is performed. This pressure adjusting method is called "electric cylinder type". It should be noted that the fluid pump and the pressure adjusting valve are not used in the electric cylinder type first pressure adjusting unit YC.

The first pressure adjusting unit YC includes an electric motor MD for pressure adjustment, a speed reducer GS, a rotation/linear motion conversion mechanism (screw mechanism) NJ, a pressing member PO, a pressure adjusting cylinder CD, a pressure adjusting piston PD, and a return elastic body. SD.

The pressure adjusting electric motor (pressure adjusting motor) MD is a power source for the first pressure adjusting unit YC to adjust (increase or decrease) the brake liquid pressure Pw. The pressure adjusting motor MD is driven by the controller ECU based on the drive signal Md. For example, a brushless motor may be employed as the pressure adjusting motor MD.

The speed reducer GS includes a small-diameter gear SK and a large-diameter gear DK. Here, the number of teeth of the large-diameter gear DK is greater than the number of teeth of the small-diameter gear SK. Therefore, the rotational power of the electric motor MD is reduced by the speed reducer GS and transmitted to the screw mechanism NJ. Specifically, the small-diameter gear SK is fixed to the output shaft of the electric motor MD. The large-diameter gear DK and a bolt member BT are fixed so that the large-diameter gear DK is engaged with the small-diameter gear SK, and the rotation shaft of the large-diameter gear DK coincides with the rotation shaft of the bolt member BT of the screw mechanism NJ. That is, in the speed reducer GS, the rotational power from the electric motor MD is input to the small-diameter gear SK, which is then reduced and output from the large-diameter gear DK to the screw mechanism NJ.

In the screw mechanism NJ, the rotational power of the speed reducer GS is converted into a linear power Fe of the pressing member PO. A nut member NT is fixed to the pressing member PO. The bolt member BT of the screw mechanism NJ is fixed coaxially with the large-diameter gear DK. Since the rotary motion of the nut member NT is restrained by the key member KY, the rotation of the large-diameter gear DK causes the nut member NT (i.e., the pressing member PO) screwed with the bolt member BT to move in the direction of the rotation shaft of the large-diameter gear DK. That is, the rotational power of the pressure adjusting motor MD is converted into the linear power Fe of the pressing member PO by the screw mechanism NJ.

The pressure adjusting piston PD is moved by the pressing member PO. The pressure adjusting piston PD is inserted into an inner hole of the pressure adjusting cylinder CD, and a combination of the piston and the cylinder is formed. Specifically, a seal SL is provided on the outer periphery of the pressure adjusting piston PD, and liquid tightness is secured between the pressure adjusting piston PD and the inner hole (internal cylindrical surface) of the pressure adjusting cylinder CD. That is, a liquid pressure chamber (pressure adjusting cylinder chamber) Ra is defined by the pressure adjusting cylinder CD and the pressure adjusting piston PD.

A return elastic body (compression spring) SD is provided in the pressure adjusting cylinder chamber Ra of the first pressure adjusting unit YC. When the electrification to the pressure adjusting motor MD is stopped by the return elastic body SD, the pressure adjusting piston PD is returned to the initial position (position corresponding to zero of the brake liquid pressure). Specifically, a stopper portion Sp is provided inside the pressure adjusting cylinder CD, and when the output of the pressure adjusting motor MD is "0", the pressure adjusting piston PD is pressed to a position (initial position) at which it abuts against the stopper portion Sp by the return elastic body SD.

The pressure adjusting cylinder chamber Ra is connected to the pressure adjusting fluid passage HC. As the pressure adjusting piston PD is moved in the direction of the center axis, the volume of the pressure adjusting cylinder chamber Ra changes. The adjusted liquid pressure (first liquid pressure) Pc is thereby adjusted. Specifically, when the pressure adjusting motor MID is rotationally driven to rotate in forward direction, the pressure adjusting piston PD is moved in the advancing direction (leftward direction in the figure) He so that the volume of the pressure adjusting cylinder chamber Ra decreases, and the adjusted liquid pressure Pc is increased, and the brake liquid BF is discharged from the pressure adjusting cylinder CD to the pressure adjusting fluid passage HC. On the other hand, when the pressure adjusting motor MD is rotationally driven to rotate in the reverse direction, the pressure adjusting piston PD is moved in the retreating direction (rightward direction in the drawing) Hg so that the volume of the pressure adjusting cylinder chamber Ra increases, and the adjusted liquid pressure Pc is decreased, and the brake liquid BF is returned to the pressure adjusting cylinder chamber Ra through the pressure adjusting fluid passage HC. The adjusted liquid pressure Pc is adjusted (increased or decreased) by driving the pressure adjusting motor MD in the forward direction or the reverse direction. Similarly to the above, the pressure adjusting fluid passage HC is provided with an adjusted liquid pressure sensor PC so as to detect the adjusted liquid pressure Pc.

The pressure adjusting motor MD is controlled based on the front wheel target liquid pressure Ptf and the adjusted liquid pressure Pc (detection value). First, based on the front wheel target liquid pressure Ptf, the indicated electrification amount Is is calculated to monotonically increase from "0" as the front wheel target liquid pressure Ptf increases from "0". Then, the compensation electrification amount Iu is calculated based on the deviation hP between the front wheel target liquid pressure Ptf and the adjusted liquid pressure Pc. In a case where "hP>py (predetermined value)", the compensation electrification amount Iu is increased as a value of positive sign (corresponding to the forward direction of the pressure adjusting motor MD) according to the increase of the liquid pressure deviation hP. In a case where "hP<−py (predetermined value)", the compensation electrification amount Iu is decreased as a value of negative sign (corresponding to the reverse direction of the pressure adjusting motor MD) according to the decrease of the liquid pressure deviation hP. In a case where "−py≤hP≤py", it is calculated as "Iu=0". Here, the predetermined value py is a preset constant.

Finally, the target electrification amount It is determined based on the indicated electrification amount Is and the compensation electrification amount Iu. In the pressure adjusting control of the adjusted liquid pressure Pc, the indicated electrification amount Is is a feedforward component, and the compensation electrification amount Iu is a feedback component. For example, the target electrification amount It is calculated by adding the indicated electrification amount Is and the compensation electrification amount Iu. The target electrification amount It is a target value of the electrification amount to the pressure adjusting motor MD, and the electrification amount (current) feedback control is executed based on the target electrification amount It and the actual electrification amount Ia (detection value). Here, the actual electrification amount Ia is detected by an electrification amount sensor (current sensor) IA provided in a drive circuit of the pressure adjusting motor MD.

<When Generator GN for Energy Regeneration is Provided on Rear Wheel WHr>

A case where the generator GN is provided on the front wheel WHf has been described above. The generator GN may be provided on the rear wheel WHr. That is, the rear wheel WHr is a regenerative wheel WHg (corresponding to "one wheel") on which the generator GN is provided, and the wheel cylinders CWr (CWk, CW1) of the rear wheels is a regenerative wheel cylinder CWg. On the other hand, the front wheel WHf is a non-regenerative wheel WHt (corresponding to "the other wheel") on which the generator GN is not provided, and the wheel cylinders CW (CWi, CWj) of the front wheels is a non-regenerative wheel cylinder CWt.

In a vehicle in which the rear wheel WHr is the regenerative wheel WHg, the front wheel second fluid pump QLf driven by the second electric motor ML, the front wheel second pressure adjusting valve UPf, and the front wheel output liquid pressure sensor PPf are provided as the second pressure adjusting unit YD (see the components shown with broken lines in FIG. 1). Then, the adjusted liquid pressure Pc by the first pressure adjusting unit YC is directly supplied to the rear wheel braking system (i.e., the wheel cylinder CWr of the rear wheel) related to the rear wheel WHr without being adjusted. Therefore, the rear wheel brake liquid pressure Pwr matches the adjusted liquid pressure Pc. On the other hand, in the front wheel braking system related to the front wheels WHf (i.e., the wheel cylinder CWf of the front wheel), the adjusted liquid pressure Pc (actual value) is increased by the front wheel second pressure adjusting valve UPf to be the front wheel output liquid pressure Ppf, and the output liquid pressure Ppf is applied. Therefore, the front wheel brake liquid pressure Pwf is equal to the front wheel output liquid pressure Ppf. In the independent control of the vehicle in which the generator GN is provided on the rear wheel WHr, the front wheel brake liquid pressure Pwf is larger than the rear wheel brake liquid pressure Pwr.

In addition, the following points are different in the calculation process of the regenerative cooperative control described with reference to FIG. 2.

(1) In step S210, the target rotation number Nt is determined based on the rear wheel target liquid pressure Ptr instead of the front wheel target liquid pressure Ptf.

(2) In step S220, the liquid pressure deviation hP (=Ptr−Pc) is determined based on the rear wheel target liquid pressure Ptr instead of the front wheel target liquid pressure Ptf. That is, the pressure adjusting unit YC (particularly, the linear pressure adjusting valves UC, UA, UB, or the electric motor MID) is controlled such that the actual adjusted liquid pressure Pc matches the rear wheel target liquid pressure Ptr.

(3) In step S240, the servo control is executed by "the front wheel second pressure adjusting valve UPf, the front wheel output liquid pressure sensor PPf, the actual front wheel output liquid pressure Ppf, and the front wheel target liquid pressure Ptf" (that is, "hQ=Ptf−Ppf") instead of "the rear wheel second pressure adjusting valve UPr, the rear wheel output liquid pressure sensor PPr, the actual rear wheel output liquid pressure Ppr, and the rear wheel target liquid pressure Ptr". The adjusted liquid pressure Pc is increased, and the electrification amount to the front wheel charge valve UPf is controlled (adjusted) so that the front wheel output liquid pressure Ppf (detection value) matches the front wheel target liquid pressure Ptf Here, a relationship of "Pc<Ppf (Ptf)" is obtained.

Figure 6:
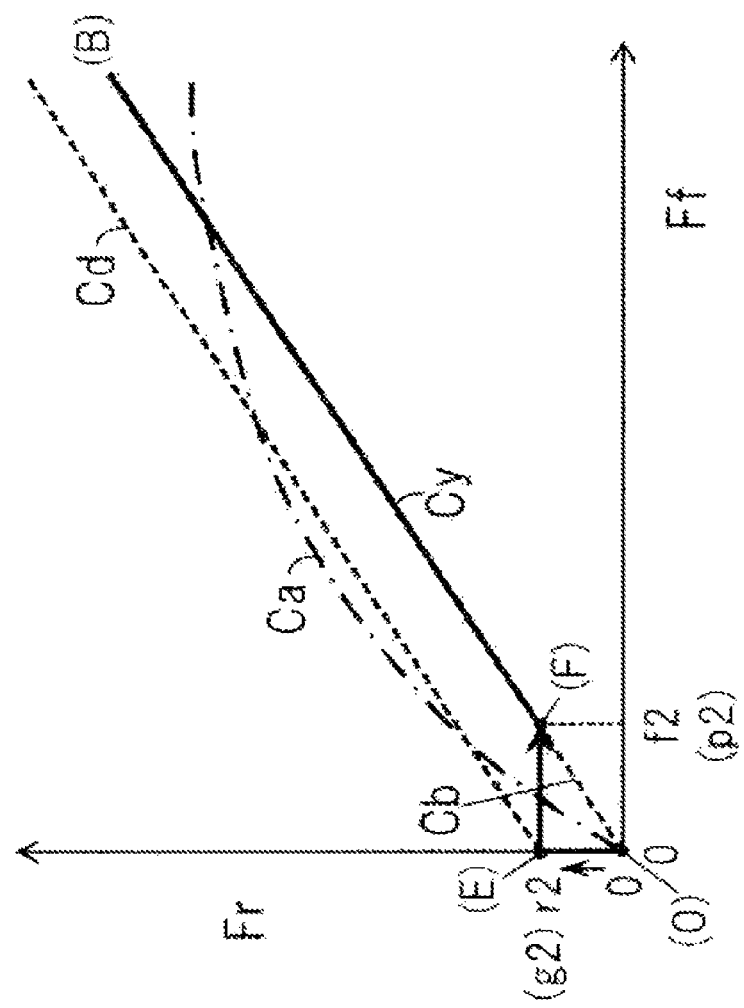
FIG. 6 is a characteristic diagram describing a front-rear distribution of a braking force in a regenerative cooperative control in a vehicle including a generator GN on a rear wheel WHr.

With reference to the characteristic diagram of FIG. 6, the independent control of the regenerative cooperative control in a vehicle in which the regenerative generator GN is provided on the rear wheel WHr will be described. The characteristic diagram shows the relationship between the front wheel braking force Ff based on only the friction braking force Fp and the rear wheel braking force Fr (=Fgr+Fpr) including the regenerative braking force Fgr. Similarly to the above, the characteristic Ca indicated by the chain dashed line is a diagram of the ideal braking force distribution.

When the operation of the brake operation member BP is started, in the initial stage of braking (the state of "Gt<rg (=g2)"), "Ptf=0, Ptr=0" is calculated, and the front wheel and rear wheel friction braking force Fpf, Fpr are not generated. Therefore, the rear wheel braking force Fr is increased from "0" toward the second predetermined force r2 only by the regenerative braking force Fgr, but the front wheel braking force Ff remains at "0" (see transition from origin (O) to point (E)).

When the operation amount Ba of the brake operation member BP is increased and the rear wheel braking force Fr (=Fgr) reaches the second predetermined force r2 (i.e., the regeneration amount Rg reaches the second predetermined amount g2 corresponding to the second predetermined force r2), affirmative determination is made in step S150, and the processes of step S180 and step S190 are executed. First, at the time point (calculation cycle) affirmative determination is made in step S150, the front wheel target liquid pressure Ptf is calculated to be "the second predetermined liquid pressure p2 corresponding to the second predetermined force f2" (see transition from point (E) to point (F)) so that the front wheel braking force Ff rapidly increases from "0" to the second predetermined force f2. The stepwise sudden increase of the front wheel brake liquid pressure Pwf (=Ppf) from "0" is achieved by the second pressure adjusting unit YD (particularly, the front wheel second pressure adjusting valve UPf).

After such time point, the friction braking force Fp is increased along the reference characteristic Cb (characteristic indicated by diagram (O)–(B) of the relationship between the front wheel braking force Ff and the rear wheel braking force Fr when the regenerative braking force Fgr does not act, defined by the pressure receiving area of the wheel cylinder CW, the effective braking radius of the rotating member KT, and the friction coefficient of the friction material). Specifically, the front wheel target liquid pressure Ptf is calculated to monotonically increase from "the second predetermined liquid pressure p2 corresponding to the second predetermined force f2" according to the increase in the operation amount Ba. Furthermore, the rear wheel target liquid pressure Ptr monotonically increases from "0" according to the increase in the operation amount Ba. That is, in "Fr<r2", "Ft=0", and in "Fr≥r2", the characteristic Cy (diagram (O)-(E)-(F)-(B) that matches the reference characteristic Cb is achieved.

Similarly to the above, in steps S200 and S210, the rotation number servo control is executed in the electric motor MC so that the actual value Na of the rotation number matches the target value Nt determined according to the rear wheel target liquid pressure Ptr. Then, in step S220, the liquid pressure servo control is performed in the pressure adjusting valve UC such that the actual value Pc of the liquid pressure matches the rear wheel target liquid pressure Ptr. As a result, a resultant force Fr (=Fgr+Fpr) of the regenerative braking force Fgr corresponding to the predetermined regeneration amount rg and the friction braking force Fpr corresponding to the adjusted liquid pressure Pc acts on the rear wheel WHr. In step S230, the electric pump DL (particularly, the electric motor ML) is rotated, and in step S240, the liquid pressure servo control is executed in the front wheel charge valve UPf so that the actual value Ppf of the output liquid pressure matches the target value Ptf. Thus, the adjusted liquid pressure Pc is increased, the front wheel output liquid pressure Ppf is formed, and independent control of the front and rear wheel systems is achieved.

Similarly, when the front wheel output liquid pressure sensor PPf is omitted, the deceleration slip of the wheel (also simply referred to as the "wheel slip") Sw is used as a state variable, and the slip servo control is executed. As the wheel slip (state quantity) Sw, the vehicle body speed Vw, the wheel speed Vx, the deviation hV and the wheel slip rate obtained by dividing the speed deviation hV by the vehicle body speed Vx can be adopted. For example, in step S240, a front wheel target slip Stf corresponding to the front wheel target liquid pressure Ptf is calculated. An actual value Swf of the front wheel slip is calculated according to a difference hV between the front wheel speed Vwf and the vehicle body speed Vx. The slip servo control of the front wheel charge valve UPf is executed so that the actual value Swf matches the target value Stf. Even in such a case, it is increased from the adjusted liquid pressure Pc, and the front wheel output liquid pressure Ppf is formed.

The characteristic Cd indicates a characteristic when the front wheel target liquid pressure Ptf is increased not from the second predetermined liquid pressure p2 but from "0" (i.e., when independent control is not performed and "Ptf=Ptr"). The rear wheel braking force Fr in the characteristic Cd is larger than the rear wheel braking force Fr in the ideal distribution characteristic Ca. Thus, in the characteristic Cc, the rear wheel braking force Fr is fully utilized, but there is concern about vehicle stability.

The adjusted liquid pressure Pc is adjusted to increase by the front wheel charge valve UPf and the output liquid pressures Ppf and Ppr of the braking systems of the front and rear wheels are individually controlled. Thus, the distribution of the braking forces Ff and Fr of the front and rear wheels is suitably adjusted, and both maintaining of vehicle deceleration and vehicle stability, and securing of regenerative energy can be achieved.

<When Generator GN for Energy Regeneration is Provided on Both Front Wheel WHf and Rear Wheel WHr>

Referring to the characteristic diagram of FIG. 7, a case where front and rear wheel regenerative generators GNf and GNr are provided on the front and rear wheels WHf, WHr will be described. That is, the vehicle includes a front wheel regenerative generator GNf for front wheels WHf and a rear wheel regenerative generator GNr for rear wheels WHr.

Figure 7A:
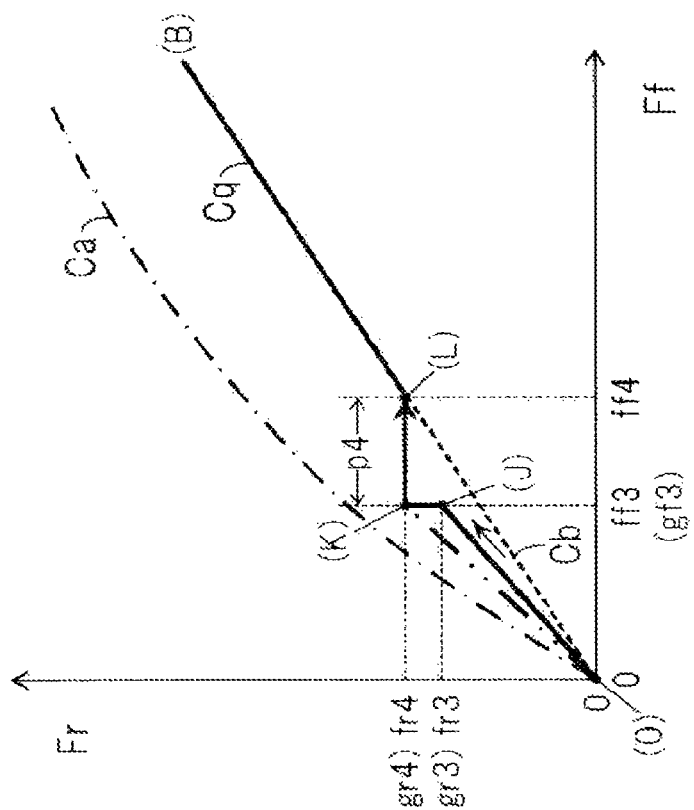
FIG. 7 is a characteristic diagram describing a front-rear distribution of a braking force in a regenerative cooperative control in a vehicle including generator GNf, GNr on the front and rear wheels WHf, WHr.

With reference to FIG. 7(a), a case where the front wheel regenerative braking force Fgf is relatively larger than the rear wheel regenerative braking force Fgr with respect to the reference characteristic Cb will be described. This corresponds to, for example, a case where the power generation capacity (regeneration capacity) of the front wheel generator GNf is larger than the power generation capacity of the rear wheel generator GNr.

As described above, the reference characteristics Cb is a correlation between the front wheel braking force Ff (i.e., front wheel friction braking force Fpf) and the rear wheel braking force Fr (i.e., rear wheel friction braking force Fpr) in a state in which both the front wheel and rear wheel regenerative braking forces Fgf, Fgr are not generated. Specifically, it is a relationship of the rear wheel braking force Fr (=Fpr) with respect to the front wheel braking force Ff (=Fpf) generated when the front wheel and rear wheel regeneration amounts Rgf and Rgr are "0" and the same liquid pressure is supplied to the fluid passage HCf for the front wheel WHf and the fluid passage HCr for the rear wheel WHr. Here, the pressure increase is not performed by the second pressure adjusting unit YD.

When "Gt<rg", in step S160, the front wheel and rear wheel regeneration amounts Rgf and Rgr (target values) are calculated based on the target deceleration Gt. Here, the sum of the front wheel regeneration amount Rgf and the rear wheel regeneration amount Rgr matches the target deceleration Gt. In other words, the target deceleration Gt is distributed to the front wheel regeneration amount Rgf and the rear wheel regeneration amount Rgr. For example, the front wheel and rear wheel regeneration amounts Rgf and Rgr are determined based on the capacity of the front wheel and rear wheel generators GNf and GNr. The front wheel and rear wheel regeneration amounts Rgf and Rgr are transmitted to the driving controller ECD through the communication bus BS. When "Gt<rg", "Ptf=0, Ptr=0" is determined, and the front wheel and rear wheel friction braking forces Fpf and Fpr are not increased (see FIG. 2).

According to the increase in the front wheel and rear wheel regeneration amounts Rgf and Rgr, the front wheel braking force Ff (=Fgf) and the rear wheel braking force Fr (=Fgr) are respectively increased in the braking force distribution diagram. Since the front wheel regenerative braking force Fgf is relatively larger than the rear wheel regenerative braking force Fgr with respect to the reference characteristic Cb, in the distribution diagram, the diagram showing the relationship between the front wheel regenerative braking force Fgf and the rear wheel regenerative braking force Fgr is located below the reference characteristic Cb.

When the regeneration amount Rgf of the front wheel generator GNf reaches a predetermined regeneration amount gf1 (in this case, "Fgf=ff1"), the power generation capacity of the rear wheel generator GNr is relatively small, and thus the rear wheel regeneration amount Rgr reaches the limit value gr1 (in this case, "Fgr=fr1"). Thereafter, the state of "Rgr=gr1" (i.e., the state of "Fgr=fr1") is maintained, and the front wheel regeneration amount Rgf is increased toward the predetermined regeneration amount gf2. Accordingly, the front wheel braking force Ff (=Fgf) is increased to the predetermined value ff2.

When the conditions of step S150 are satisfied at a time point (point (H)) at which the front wheel and rear wheel regeneration amounts Rgf, Rgr reach the predetermined regeneration amounts gf2 and gr1, respectively, the adjusted liquid pressure Pc starts to be increased from "0" by the first pressure adjusting unit YC. At the same time, the rear wheel output liquid pressure Ppr (=Pwr) is rapidly increased in a stepwise manner (see transition from point (H) to point (I)) by a predetermined liquid pressure p3 from "0" by the second pressure adjusting unit YD. Here, the predetermined liquid pressure (predetermined value) p3 is a preset constant. Thereafter, the rear wheel output liquid pressure Ppr (actual value) is monotonically increased from the predetermined liquid pressure p3, and the characteristic Cp (diagram (O)-(G)-(H)-(I)-(B)) along the reference characteristic Cb is achieved. When the limit of the front wheel generator GNf and the limit of the rear wheel generator GNr occur simultaneously, the characteristic Cp changes from point (O) to point (H) as indicated by a two-dot chain line.

Similarly to the above, even when the front wheel and rear wheel regenerative generators GNf and GNr are provided on the front and rear wheels WHf, WHr, the braking forces Ff and Fr of the front and rear wheels are suitably secured by the independent control of the regenerative cooperative control, and the regenerable energy amount can be sufficiently secured while maintaining vehicle stability.

Figure 7B:
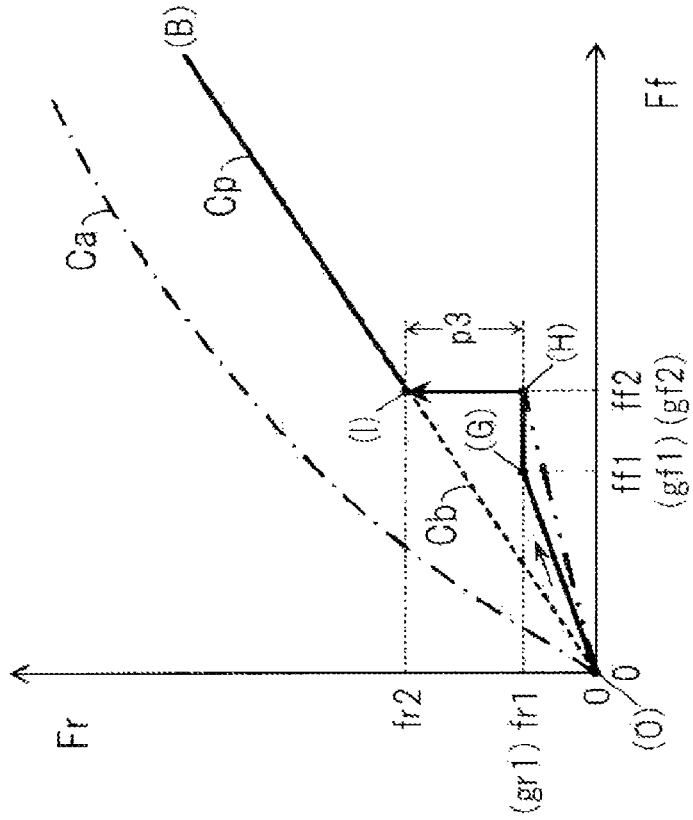

Next, with reference to FIG. 7(b), a case where the rear wheel regenerative braking force Fgr is relatively larger than the front wheel regenerative braking force Fgf with respect to the reference characteristic Cb will be described. This corresponds to, for example, a case where the power generation capacity (regeneration capacity) of the rear wheel generator GNr is larger than the power generation capacity of the front wheel generator GNf.

Similarly to a case of "Fgf>Fgr", when "Gt<rg", in step S160, the front wheel and rear wheel regeneration amounts Rgf and Rgr (target values) are calculated based on the target deceleration Gt. At this time, the relationship between the state quantities is "Gt=Rgf+Rgr" and "Ptf=0, Ptr=0".

According to the increase in the front wheel and rear wheel regeneration amounts Rgf and Rgr, the front wheel braking force Ff (=Fgf) and the rear wheel braking force Fr (=Fgr) are respectively increased in the braking force distribution diagram. Since the rear wheel regenerative braking force Fgr is relatively larger than the front wheel regenerative braking force Fgf with respect to the reference characteristic Cb, in the distribution diagram, the diagram showing the relationship between the front wheel regenerative braking force Fgf and the rear wheel regenerative braking force Fgr is located above the reference characteristic Cb.

When the regeneration amount Rgr of the rear wheel generator GNr reaches a predetermined value gf3 (in this case, "Fgr=ff3"), the power generation capacity of the front wheel generator GNf is relatively small, and thus the front wheel regeneration amount Rgf reaches the limit value gf3 (in this case, "Fgf=ff3"). Thereafter, the state of "Rgf=gf3" (i.e., the state of "Fgf=ff3") is maintained, and the rear wheel regeneration amount Rgr is increased toward the predetermined value gr4. Accompanying this, the rear wheel braking force Fr (=Fgr) is increased to the predetermined value fr4 (see diagrams (O)-(J)-(K)).

When the conditions of step S150 are satisfied at a time point (point (K)) at which the front wheel and rear wheel regeneration amounts Rgf, Rgr reach the predetermined values gf3 and gr4, respectively, the adjusted liquid pressure Pc starts to be increased from "0" by the first pressure adjusting unit YC. At the same time, the front wheel output liquid pressure Ppf (=Pwf) is rapidly increased in a stepwise manner (see transition from point (K) to point (L)) by a predetermined liquid pressure p4 from "0" by the second pressure adjusting unit YD. Here, the predetermined value p4 is set in advance as a constant. Thereafter, the front wheel output liquid pressure Ppf (actual value) is monotonically increased from the predetermined liquid pressure p4, and the characteristic Cq (diagram (O)-(J)-(K)-(L)-(B)) along the reference characteristic Cb is achieved. When the limit of the front wheel generator GNf and the limit of the rear wheel generator GNr occur simultaneously, the characteristic Cq changes from point (O) to point (K) as indicated by a two-dot chain line.

Similarly to the above, even when the front wheel and rear wheel regenerative generators GNf and GNr are provided on the front and rear wheels WHf, WHr, the distribution of the braking forces Ff and Fr of the front and rear wheels is suitably adjusted by the independent control of the regenerative cooperative control, and the maintaining of vehicle deceleration and vehicle stability and securing of regenerative energy can be achieved.

<Operation/Effect>

The brake control device SC is mounted on a vehicle in which the regenerative generator GN is provided on one of the front wheels WHf and the rear wheels WHr. Here, the wheel provided with the generator GN is a regenerative wheel WHg (corresponding to "one wheel"), and the wheel not provided with the generator GN is a non-regenerative wheel WHt (corresponding to "other wheel").

The brake control device SC includes the first pressure adjusting unit YC and the second pressure adjusting unit YD. The liquid pressure generated by the first electric motors MC, MZ, MD is adjusted by the first pressure adjusting unit YC to a first liquid pressure (adjusted liquid pressure) Pc. The first liquid pressure Pc is applied (e.g., introduced) to the regenerative wheel cylinder CWg of the regenerative wheel WHg. The second pressure adjusting unit YD includes the fluid pump (second fluid pump) QL driven by the second electric motor ML and the pressure adjusting valve UP. The first liquid pressure Pc is adjusted to increase by the second pressure adjusting unit YD to a second liquid pressure (output liquid pressure) Pp. The second liquid pressure Pp is applied (e.g., introduced) to the non-regenerative wheel cylinder CWt of the non-regenerative wheel WHt. The regenerative wheel WHg and the non-regenerative wheel WHt are different (separate) wheels.

In the brake control device SC, when the regeneration amount Rg of the regenerative generator GN is less than the predetermined regeneration amounts g1 and g2, the first liquid pressure Pc is maintained at "0 (zero)" by the first pressure adjusting unit YC, and the second liquid pressure Pp is maintained at "0 (zero)" by the second pressure adjusting unit YD. That is, in a state in which the regeneration amount Rg is less than the predetermined regeneration amounts g1 and g2, only the regenerative braking force Fg is generated and the friction braking force Fp is not generated.

The adjusted liquid pressure Pc is adjusted to increase by the second pressure adjusting unit YD, and the liquid pressures (output liquid pressures) Ppf and Ppr of the braking systems of the front and rear wheels are independently controlled. At a time point (calculation cycle) the regeneration amount Rg of the regenerative generator GN reaches the predetermined regeneration amounts g1 and g2, the second liquid pressure Pp is rapidly increased from "0 (zero)" to the predetermined liquid pressure p1, p2 by the second pressure adjusting unit YD. For example, when the brake operation amount Ba is gradually increased, the first liquid pressure Pc applied to the regenerative wheel cylinder CWg is gradually increased from "0" in accordance with (depending on) the time change amount (operation speed) of the operation amount Ba from the time point at which the regeneration amount Rg has reached the predetermined regeneration amount g1, g2. On the other hand, the second liquid pressure Pp applied to the non-regenerative wheel cylinder CWt is increased in a stepwise manner from "0" to the predetermined liquid pressures p1, p2 regardless of (independent of) the operation speed at the time point at which the regeneration amount Rg has reached the predetermined regeneration amounts g1, g2. Thereafter, the second liquid pressure Pp is gradually increased from the predetermined liquid pressures p1, p2 according to the operation speed. As a result, the braking forces Ff and Fr of the front and rear wheels are suitably secured, the vehicle stability is maintained, and a sufficient regenerable energy amount can be secured.

The brake control device SC includes a yaw rate sensor YR that detects the yaw rate Yr of the vehicle. Then, based on the yaw rate Yr, the vehicle stabilization control for suppressing excessive oversteer behavior of the vehicle is executed by the second pressure adjusting unit YD. The vehicle in which the regenerative cooperative control is executed may already be provided with a liquid pressure unit YL for vehicle stabilization control. In this case, an existing liquid pressure unit YL is used as the second pressure adjusting unit YD. The independent control in the front and rear braking systems can be achieved without adding new devices.

The first pressure adjusting unit YC (reflux type) is configured to include a fluid pump QC driven by the first electric motor MC and a pressure adjusting valve UC. The adjusted liquid pressure Pc is adjusted by narrowing the reflux of the brake liquid BF formed by the fluid pump QC by the pressure adjusting valve UC. In the accumulator type first pressure adjusting unit YC, the high pressure accumulated in the accumulator AZ is adjusted to decrease by the pressure adjusting valves UA and UB. Since a slight change in the valve opening amount of the pressure adjusting valve greatly changes the pressure adjustment result, it is particularly important to secure pressure adjustment accuracy (liquid pressure resolution) at low pressure. In the reflux type first pressure adjusting unit YC, the adjusted liquid pressure Pc is increased from "0" at the time of braking. Thus, the control accuracy in the low-pressure region can be easily secured.

In the electric cylinder type first pressure adjusting unit YC, the amount of the brake liquid BF required for pressure adjustment is limited by the cylinder capacity (particularly, piston displacement in the cylinder). In other words, in order to secure the capacity (volume) of the brake liquid BF required for pressure adjustment, a large-diameter and long pressure adjusting cylinder CD is required. On the other hand, in the reflux type first pressure adjusting unit YC, the circulation (reflux) of the brake liquid BF by the electric pump DC is used to form the adjusted liquid pressure Pc, and hence there is no limitation on the amount of brake liquid BF. For this reason, in the brake control device SC requiring a large flow rate, downsizing can be achieved by the reflux type first pressure adjusting unit YC.

Furthermore, as the brake control device SC, in the master piston PM, a servo chamber Rs is provided on the side opposite to the master cylinder chamber Rm (rear portion of the master piston PM), and the adjusted liquid pressure (first liquid pressure) Pc is introduced (supplied) to the servo chamber Rs. At this time, the master cylinder chamber for the wheel cylinder CWr of the rear wheel is omitted, and the adjusted liquid pressure Pc is directly introduced (supplied) to the wheel cylinder CWr of the rear wheel. The master cylinder CM thus can be shortened.

The brake control device SC can be mounted on a vehicle including the regenerative generators GNf and GNr on both the front wheels WHf and the rear wheels WHr. That is, the front wheel WHf is provided with a front wheel regenerative generator GNf, and the rear wheel WHr is provided with a rear wheel regenerative generator GNr. Similarly to the above, the first pressure adjusting unit YC adjusts the liquid pressure generated by the first electric motors MC, MZ, MD to a first liquid pressure (adjusted liquid pressure) Pc. Then, the first pressure adjusting unit YC applies the first liquid pressure Pc with respect to the wheel cylinder CW of the wheel corresponding to the larger one of the front wheel regenerative braking force Fgf and the rear wheel regenerative braking force Fgr with respect to the reference characteristic Cb. The second pressure adjusting unit YD is configured by a fluid pump QL driven by the second electric motor ML and a pressure adjusting valve UP, and performs adjustment to increase the first liquid pressure Pc to the second liquid pressure (output liquid pressure) Pp. The second pressure adjusting unit YD applies the second liquid pressure Pp with respect to the wheel cylinder CW of the wheel corresponding to the smaller one of the front wheel regenerative braking force Fgf and the rear wheel regenerative braking force Fgr with respect to the reference characteristic Cb. Note that the reference characteristic Cb shows a relationship between the front wheel braking force Ff of the front wheel WHf and the rear wheel braking force Fr of the rear wheel WHr in a case where the front wheel regenerative braking force Fgf by the front wheel regenerative generator GNf is "0 (zero)" and the rear wheel regenerative braking force Fgf by the rear wheel regenerative generator GNr is "0 (zero)".

For example, when the "wheel corresponding to the larger one" is the front wheel WHf and the "wheel corresponding to the smaller one" is the rear wheel WHr, the first liquid pressure Pc is applied to the wheel cylinder CWf of the front wheel, and the second liquid pressure Pp is applied to the wheel cylinder CWr of the rear wheel. Conversely, when the "wheel corresponding to the larger one" is the rear wheel WHr and the "wheel corresponding to the smaller one" is the front wheel WHf, the second liquid pressure Pp is applied to the wheel cylinder CWf of the front wheel, and the first liquid pressure Pc is applied to the wheel cylinder CWr of the rear wheel.

In the brake control device SC, when the regeneration amounts Rgf, Rgr of the front wheel and rear wheel regenerative generators GNf, GNr are less than the predetermined regeneration amounts gf2, gr1 (or the predetermined regeneration amounts gf3, gr4), the first liquid pressure Pc is maintained at "0 (zero)" by the first pressure adjusting unit YC and the second liquid pressure Pp is maintained at "0 (zero)" by the second pressure adjusting unit YD. That is, when the front wheel and rear wheel regeneration amounts Rgf, Rgr are less than the predetermined regeneration amounts gf2, gr1 (or the predetermined regeneration amounts gf3, gr4), only the regenerative braking force Fg (Fgf, Fgr) is generated, and the friction braking force Fpf, Fpr is not generated.

Similar to the above, the liquid pressures (output liquid pressures) Ppf and Ppr of the braking systems of the front and rear wheels are independently controlled. At a time point (calculation cycle) the regeneration amounts Rgf and Rgr of the front wheel and rear wheel regenerative generators GNf and GNr have reached the predetermined regeneration amounts gf2 and gr1 (or the predetermined regeneration amounts gf3 and gr4), the first liquid pressure Pc is increased from "0" depending on the operation speed of the brake operation member BP. On the other hand, at such time point, the second liquid pressure Pp is rapidly increased from "0" by the predetermined liquid pressure p3 (or p4) by the second pressure adjusting unit YD. That is, at such time point, the second liquid pressure Pp is increased in a stepwise manner from "0" to the predetermined values p3 and p4 regardless of the time change amount (operation speed) of the operation amount Ba of the brake operation member BP. Thereafter, the second liquid pressure Pp is increased from the predetermined values p3 and p4 depending on the operation speed. Thus, the distribution ratio of the front wheel and rear wheel braking forces Ff, Fr is optimized, the vehicle stability is maintained, and a sufficient regenerable energy amount can be secured. Note that, in this case as well, an existing liquid pressure unit YL can be used as the second pressure adjusting unit YD.

Other Embodiments

Other embodiments will be described below. In other embodiments as well, similar effects as described above (securing the vehicle stability control and increasing the energy regeneration amount by optimizing the braking force distribution, etc.) can be obtained.

In the first embodiment described above, the configurations of the "tandem type master cylinder CM", the "reflux type first pressure adjusting unit YC", and the "master cylinder downstream pressurization" are illustrated (see FIG. 1). In the second embodiment, the configurations of the "single type master cylinder CM", the "accumulator type first pressure adjusting unit YC", and the "master cylinder rear surface pressurization" are illustrated (see FIG. 4). Further, as another configuration of the first pressure adjusting unit YC, the configuration of the "electric cylinder type first pressure adjusting unit YC" is illustrated (see FIG. 5). These elements can be freely combined. Therefore, one of the twelve sets shown in the list of Table 1 is adopted as the configuration of the brake control device SC. In each configuration, the fluid passages of two systems are of a front-rear type.

TABLE 1

| No. | Pressurization method | Master cylinder method | Pressure adjusting method |
|-----|----------------------|------------------------|---------------------------|
| 1 | Master cylinder downstream pressurization | Single type | Reflux type |
| 2 | | | Accumulator type |
| 3 | | | Electric cylinder type |
| 4 | | Tandem type | Reflux type |
| 5 | | | Accumulator type |
| 6 | | | Electric cylinder type |
| 7 | Master cylinder rear surface pressurization | Single type | Reflux type |
| 8 | | | Accumulator type |
| 9 | | | Electric cylinder type |
| 10 | | Tandem type | Reflux type |
| 11 | | | Accumulator type |
| 12 | | | Electric cylinder type |

In the embodiment described above, that in which the valve opening amount is adjusted according to the electrification amount is adopted in the linear type pressure adjusting valves UC, UP, UA, and UB. For example, the pressure adjusting valves UC, UP, UA, and UB are on/off valves, but may have the opening and closing of the valves controlled by a duty ratio and the liquid pressure linearly controlled.

In the embodiment described above, the liquid pressure servo control or the slip servo control is adopted in the drive control of the charge valve (second pressure adjusting valve) UP. Instead, based on the target liquid pressure Pt (Ptf, Ptr), the indicated electrification amount (e.g., the indicated current) is determined, and the electrification amount is supplied to the charge valve UP (UPf, UPr) so that the charge valve UP can be driven. Here, in the calculation map of the indicated electrification amount, it is set in advance such that the indicated electrification amount becomes larger as the target liquid pressure Pt becomes larger.

In the embodiment described above, the configuration of the disc type braking device (disc brake) has been illustrated. In this case, the friction member is a brake pad and the rotating member is a brake disc. Instead of the disc type braking device, a drum type braking device (drum brake) can be adopted. In a case where a drum brake is adopted, a brake drum is adopted in place of the caliper. The friction member is a brake shoe, and the rotating member is a brake drum.

In the embodiment described above, the upper fluid unit YU and the lower fluid unit YL are formed separately. The upper fluid unit YU and the lower fluid unit YL may be integrally formed. In this case, the lower controller ECL is included in the upper controller ECU.

The invention claimed is:

1. A vehicle brake control device in which a regenerative generator is provided on either one of a front wheel and a rear wheel of a vehicle, the vehicle brake control device comprising:
a first pressure adjusting unit that adjusts a liquid pressure generated by a first electric motor to a first liquid pressure; and
a second pressure adjusting unit that is configured by a fluid pump driven by a second electric motor and a pressure adjusting valve, and that performs adjustment to increase the first liquid pressure to a second liquid pressure, wherein
the first pressure adjusting unit applies the first liquid pressure to a wheel cylinder of a wheel on one side,
the second pressure adjusting unit applies the second liquid pressure to a wheel cylinder of a wheel on an other side different from the wheel on the one side, when a regeneration amount of the regenerative generator is less than a predetermined regeneration amount, the first pressure adjusting unit is configured to maintain the first liquid pressure at zero, and the second pressure adjusting unit is configured to maintain the second liquid pressure at zero.

2. The vehicle brake control device according to claim 1, further comprising:

a yaw rate sensor that detects a yaw rate of the vehicle, wherein the second pressure adjusting unit is configured to execute a vehicle stabilization control that suppresses excessive oversteer behavior of the vehicle based on the yaw rate.

3. The vehicle brake control device according to claim 1, wherein the regenerative generator is provided on the front wheel of the vehicle, the second pressure adjusting unit determines the second liquid pressure so that a rear wheel braking force rapidly increases from zero to a first predetermined force on a reference characteristic when the regeneration amount of the regenerative generator reaches the predetermined regeneration amount, and the reference characteristic represents a correlation between a front wheel braking force and the rear wheel braking force when the regeneration amount of the regenerative generator is zero.

4. The vehicle brake control device according to claim 1, wherein the regenerative generator is provided on the rear wheel of the vehicle, the second pressure adjusting unit determines the second liquid pressure so that a front wheel braking force rapidly increases from zero to a second predetermined force on a reference characteristic when the regeneration amount of the regenerative generator reaches the predetermined regeneration amount, and the reference characteristic represents a correlation between the front wheel braking force and a rear wheel braking force when the regeneration amount of the regenerative generator is zero.

5. A vehicle brake control device in which a front wheel regenerative generator is provided on a front wheel and a rear wheel regenerative generator is provided on a rear wheel, the vehicle brake control device comprising:

a first pressure adjusting unit that adjusts a liquid pressure generated by a first electric motor to a first liquid pressure; and a second pressure adjusting unit that is configured by a fluid pump driven by a second electric motor and a pressure adjusting valve, and that performs adjustment to increase the first liquid pressure to a second liquid pressure, wherein when a front wheel regenerative braking force by the front wheel regenerative generator is zero and a rear wheel regenerative braking force by the rear wheel regenerative generator is zero, and a relationship between a front wheel braking force of the front wheel and a rear wheel braking force of the rear wheel is set as a reference characteristic, the first pressure adjusting unit applies the first liquid pressure to a wheel cylinder of a wheel corresponding to a relatively larger one of the front wheel regenerative braking force and the rear wheel regenerative braking force with respect to the reference characteristic, and the second pressure adjusting unit applies the second liquid pressure to a wheel cylinder of a wheel corresponding to a relatively smaller one of the front wheel regenerative braking force and the rear wheel regenerative braking force with respect to the reference characteristic.

* * * * *

UNITED STATES PATENT AND TRADEMARK OFFICE
CERTIFICATE OF CORRECTION

PATENT NO. : 11,364,805 B2
APPLICATION NO. : 16/645637
DATED : June 21, 2022
INVENTOR(S) : Takayuki Yamamoto It is certified that error appears in the above-identified patent and that said Letters Patent is hereby corrected as shown below:

On the Title Page

Column 1, Item (73), the Assignee's name is incorrect. Item (73) should read:
-- (73) Assignee: ADVICS CO., LTD., Kariya (JP) --

Signed and Sealed this
Twenty-third Day of August, 2022

Katherine Kelly Vidal
*Director of the United States Patent and Trademark Office*